(12) United States Patent
Blevins et al.

(10) Patent No.: US 10,953,375 B2
(45) Date of Patent: Mar. 23, 2021

(54) APPARATUS IN THE FORM OF A UNITARY, SINGLE-PIECE STRUCTURE CONFIGURED TO GENERATE AND MIX ULTRA-FINE GAS BUBBLES INTO A HIGH GAS CONCENTRATION AQUEOUS SOLUTION

(71) Applicant: Gaia USA, Inc., Scottsdale, AZ (US)

(72) Inventors: Tim Blevins, Peoria, AZ (US); Mayur Dev, Phoenix, AZ (US); Jason Applewhite, Spring, TX (US)

(73) Assignee: Gaia USA, Inc., Scottsdale, AZ (US)

( * ) Notice: Subject to any disclaimer, the term of this patent is extended or adjusted under 35 U.S.C. 154(b) by 0 days.

(21) Appl. No.: 16/768,609

(22) PCT Filed: May 30, 2019

(86) PCT No.: PCT/US2019/034749
§ 371 (c)(1),
(2) Date: May 29, 2020

(87) PCT Pub. No.: WO2019/232273
PCT Pub. Date: Dec. 5, 2019

(65) Prior Publication Data
US 2021/0046435 A1 Feb. 18, 2021

Related U.S. Application Data

(60) Provisional application No. 62/679,702, filed on Jun. 1, 2018.

(51) Int. Cl.
*B01F 5/04* (2006.01)
*B01F 3/04* (2006.01)
*B01F 5/06* (2006.01)

(52) U.S. Cl.
CPC ........ *B01F 5/0451* (2013.01); *B01F 3/04503* (2013.01); *B01F 5/0463* (2013.01); *B01F 5/0615* (2013.01); *B01F 2003/04858* (2013.01)

(58) Field of Classification Search
CPC .. B01F 3/04503; B01F 5/0451; B01F 5/0463; B01F 5/0615; B01F 2003/04858
(Continued)

(56) References Cited

U.S. PATENT DOCUMENTS

| 2,601,018 A | 6/1952 | Heyl et al. |
| 3,452,966 A | 7/1969 | Smolski |

(Continued)

FOREIGN PATENT DOCUMENTS

| CN | 87201156 U | 12/1987 |
| GB | 1254179 A | 11/1971 |

(Continued)

OTHER PUBLICATIONS

PCT/US2014/070813. Int'l Search Report & Written Opinion (dated Apr. 28, 2015).

(Continued)

*Primary Examiner* — Charles S Bushey
(74) *Attorney, Agent, or Firm* — Loza & Loza, LLP; David S. Sarisky

(57) ABSTRACT

A mixing apparatus for generating and mixing gas bubbles into an aqueous solution includes a structure defining an interior fluid-flow chamber that extends along a longitudinal axis between an input port at a liquid input end and an output port at a liquid output end. The structure includes a gas injection portion located upstream from the liquid output end and a mixing vane portion extending in the downstream direction from the gas injection portion. The gas injection portion defines a gas injection lumen and a first region of the interior fluid-flow chamber, while the mixing vane portion defines a second region of the interior fluid-flow chamber. The first region of the interior fluid-flow chamber includes a plurality of side fluid-path lumens that extend alongside a first part of the gas injection lumen. This first part of the gas (Continued)

injection lumen and the side fluid-path lumens merge with a downstream fluid-path lumen of the first region.

4 Claims, 13 Drawing Sheets

(58) Field of Classification Search
USPC .......................................... 261/76, 79.2, 108
See application file for complete search history.

(56) References Cited

U.S. PATENT DOCUMENTS

| | | | |
|---|---|---|---|
| 3,545,731 A | 12/1970 | McManus | |
| 3,761,066 A * | 9/1973 | Wheeler | B01F 5/0694 |
| | | | 261/78.2 |
| 3,852,384 A | 12/1974 | Bearden | |
| 3,953,002 A | 4/1976 | England, Jr. et al. | |
| 4,088,449 A | 5/1978 | Smith | |
| 4,127,332 A | 11/1978 | Thiruvengadam et al. | |
| 4,202,635 A | 5/1980 | Hendrickson | |
| 4,408,893 A | 10/1983 | Rice, III | |
| 4,466,741 A | 8/1984 | Kojima | |
| 4,674,888 A | 6/1987 | Carlson | |
| 4,721,562 A | 1/1988 | Barnscheidt et al. | |
| 4,749,527 A | 6/1988 | Rasmusen | |
| 4,761,077 A | 8/1988 | Werner | |
| 4,767,026 A | 8/1988 | Keller et al. | |
| 4,840,753 A | 6/1989 | Jungmann et al. | |
| 4,872,833 A | 10/1989 | Kramer | |
| 4,911,836 A | 3/1990 | Haggerty | |
| 5,073,309 A | 12/1991 | Bousquet et al. | |
| 5,091,118 A | 2/1992 | Burgher | |
| 5,498,078 A | 3/1996 | Keller | |
| 5,814,222 A | 9/1998 | Zelenak et al. | |
| 5,842,600 A | 12/1998 | Singleterry et al. | |
| 5,885,467 A | 3/1999 | Zelenak et al. | |
| 5,904,851 A | 5/1999 | Taylor et al. | |
| 5,935,490 A | 8/1999 | Archbold et al. | |
| 6,039,884 A | 3/2000 | Burris et al. | |
| 6,142,457 A | 11/2000 | Holtan et al. | |
| 6,322,055 B1 | 11/2001 | Speece | |
| 6,467,949 B1 | 10/2002 | Reeder et al. | |
| 6,474,627 B2 | 11/2002 | Speece | |
| 6,485,003 B2 | 11/2002 | Speece | |
| 6,623,635 B2 | 9/2003 | Barnes | |
| 6,668,556 B2 | 12/2003 | Speece | |
| 6,848,258 B1 | 2/2005 | Speece | |
| 6,923,568 B2 | 8/2005 | Wilmer et al. | |
| 7,103,450 B2 | 9/2006 | Kubiak et al. | |
| 7,320,749 B2 | 1/2008 | Speece et al. | |
| RE40,407 E | 7/2008 | Natarius | |
| 7,534,351 B2 | 5/2009 | Chiba | |
| 7,566,397 B2 | 7/2009 | Speece | |
| 7,772,376 B2 | 8/2010 | Payne et al. | |
| 7,814,745 B2 | 10/2010 | Levin et al. | |
| 7,905,653 B2 | 3/2011 | Wilmer et al. | |
| 7,975,991 B2 | 7/2011 | Kojima | |
| 8,177,197 B1 | 5/2012 | Ergican | |
| 8,196,906 B2 | 6/2012 | Benton et al. | |
| 8,205,541 B2 | 6/2012 | Barberio et al. | |
| 8,272,777 B2 | 9/2012 | Kohrs et al. | |
| 8,286,951 B2 | 10/2012 | Dart et al. | |
| 8,371,114 B2 | 2/2013 | Hayashi et al. | |
| 8,567,767 B2 * | 10/2013 | Fantappie | B01F 5/0688 |
| | | | 261/79.2 |
| 8,580,125 B2 | 11/2013 | Clidence et al. | |
| 10,052,596 B2 * | 8/2018 | Richardson | B01F 5/0415 |
| 2001/0033526 A1 | 10/2001 | Illy et al. | |
| 2001/0042708 A1 | 11/2001 | Barnes | |
| 2002/0066970 A1 | 6/2002 | Speece | |
| 2003/0196437 A1 | 10/2003 | Speece | |
| 2004/0112404 A1 | 6/2004 | Doke et al. | |
| 2004/0124136 A1 | 7/2004 | Bak | |
| 2005/0155922 A1 | 7/2005 | Tormaschy et al. | |
| 2005/0173326 A1 | 8/2005 | Speece | |
| 2005/0263914 A1 | 12/2005 | Kojima | |
| 2006/0120214 A1 | 6/2006 | Raftis | |
| 2006/0231500 A1 | 10/2006 | Speece et al. | |
| 2008/0062813 A1 | 3/2008 | Wilmer et al. | |
| 2008/0223782 A1 | 9/2008 | Chiba | |
| 2008/0237140 A1 | 10/2008 | Liverud et al. | |
| 2009/0034361 A1 | 2/2009 | Trang et al. | |
| 2009/0308472 A1 | 12/2009 | Harman | |
| 2010/0011967 A1 | 1/2010 | Barberio et al. | |
| 2010/0025867 A1 | 2/2010 | Benton et al. | |
| 2010/0031825 A1 | 2/2010 | Kemp | |
| 2010/0208547 A1 | 8/2010 | Kiel et al. | |
| 2011/0024362 A1 | 2/2011 | Clidence et al. | |
| 2011/0153084 A1 | 6/2011 | Wilmer et al. | |
| 2012/0160333 A1 | 6/2012 | West | |
| 2012/0195994 A1 | 8/2012 | El-Siblani et al. | |
| 2013/0215710 A1 | 8/2013 | Hepperle et al. | |
| 2015/0202579 A1 | 7/2015 | Richardson | |
| 2015/0352503 A1 | 12/2015 | Lai | |
| 2016/0339399 A1 | 11/2016 | Goi | |
| 2016/0346758 A1 * | 12/2016 | Kress | C10G 31/10 |
| 2017/0259219 A1 | 9/2017 | Russell et al. | |
| 2017/0291151 A1 | 10/2017 | Berglund | |
| 2020/0045997 A1 * | 2/2020 | Blevins | B01F 3/04503 |

FOREIGN PATENT DOCUMENTS

| | | |
|---|---|---|
| GB | 2350069 A | 11/2000 |
| GB | 2350069 B | 4/2003 |
| WO | 199512452 A2 | 5/1995 |
| WO | 2013050764 | 4/2013 |
| WO | 2013050764 A1 | 4/2013 |
| WO | 2018191431 A1 | 10/2018 |

OTHER PUBLICATIONS

PCT/US2018/027187. Int'l Search Report & Written Opinion (dated Aug. 9, 2018).
PCT/US2019/034749. Int'l Search Report & Written Opinion (dated Aug. 15, 2019).

* cited by examiner

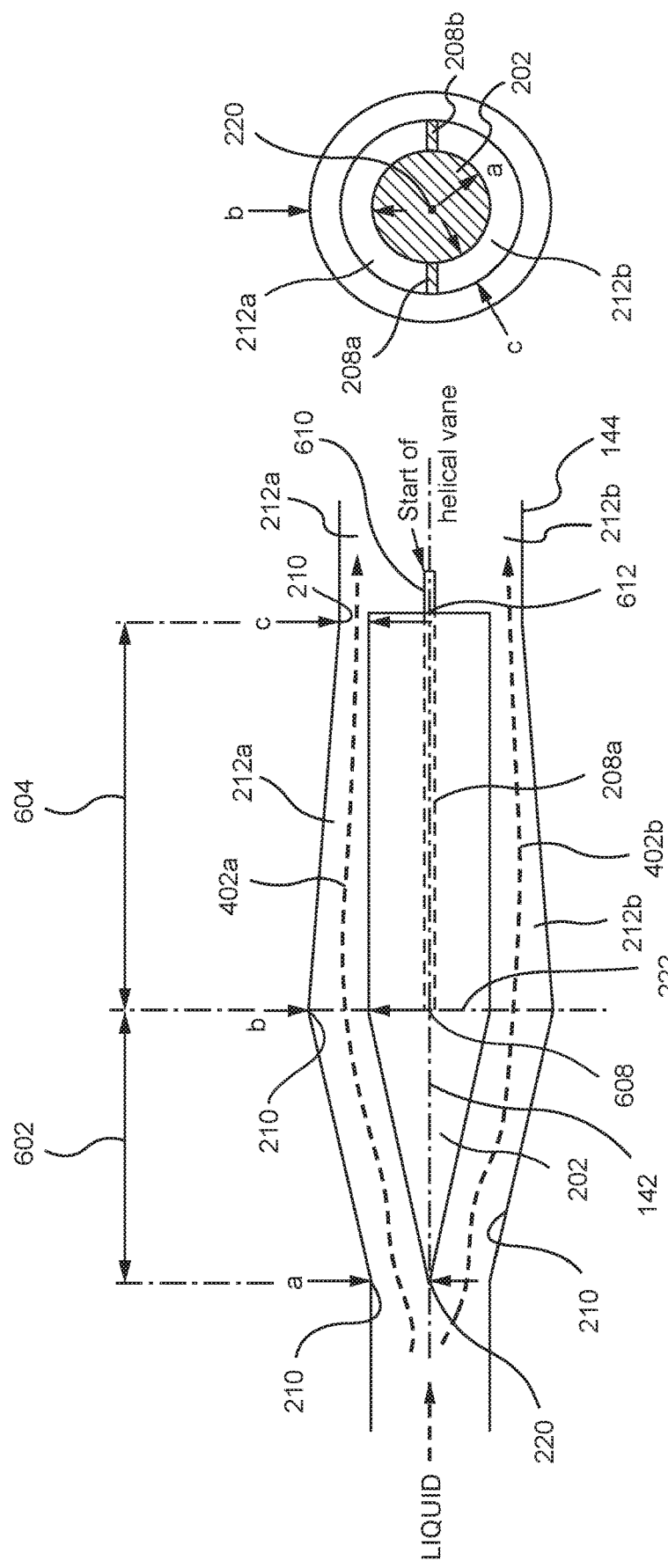

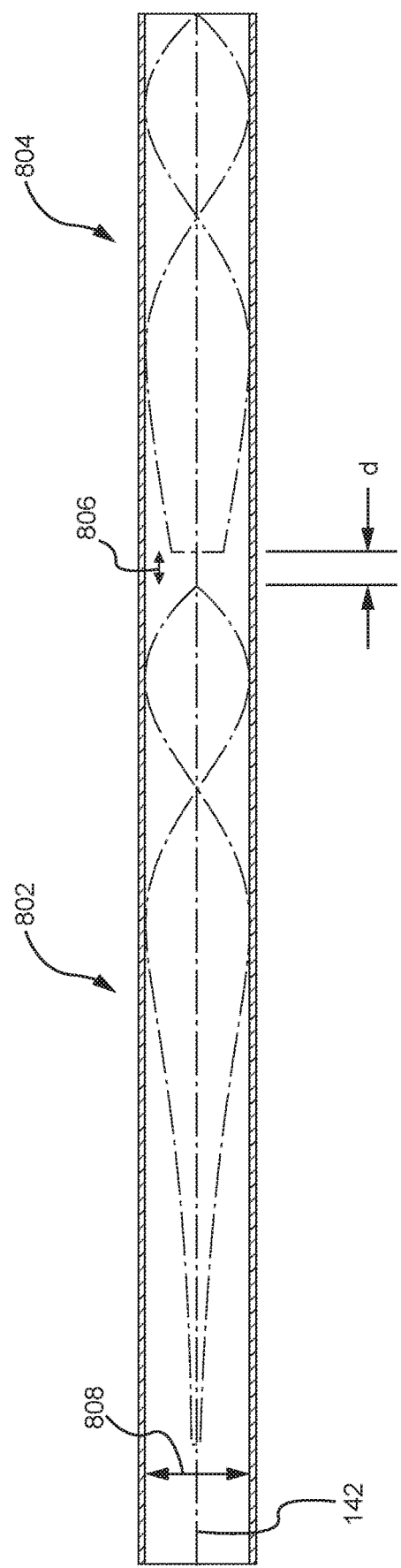

VIEW A-A

APPARATUS IN THE FORM OF A UNITARY, SINGLE-PIECE STRUCTURE CONFIGURED TO GENERATE AND MIX ULTRA-FINE GAS BUBBLES INTO A HIGH GAS CONCENTRATION AQUEOUS SOLUTION

CROSS-REFERENCE TO RELATED APPLICATIONS

This application is a U.S. national phase application of and claims priority to International Application No. PCT/US2019/034749, entitled "Apparatus in the Form of a Unitary, Single-Piece Structure Configured to Generate and Mix Ultra-Fine Gas Bubbles Into a High Gas Concentration Aqueous Solution" and filed on May 30, 2019, which claims the benefit of U.S. Provisional Application Ser. No. 62/679,702, entitled "Apparatus in the Form of a Unitary, Single-Piece Structure Configured to Generate and Mix Ultra-Fine Gas Bubbles into a High Gas Concentration Aqueous Solution" and filed on Jun. 1, 2018, each of which is expressly incorporated by reference herein in its entirety.

TECHNICAL FIELD

Aspects of the present disclosure relates to liquid and gas systems and methods that generate ultra-fine bubbles and mix them into a highly concentrated aqueous solution.

BACKGROUND

Bubbles contained in a liquid are visible to the eyes when the bubble sizes are range from 6 to 29 microns. We can see bubbles in carbonated drinks or those coming from the air diffuser in a water tank. Bubbles with the size of a few millimeters in diameter show visible surfacing action in a liquid, and the presence of fine bubbles of dozens of microns in diameter can be confirmed with white turbidity in a liquid, because these bubbles are scattering substances. Bubbles in diameter smaller than the wavelength of light are called ultra-fine bubbles, and they are too small to see. Ultra-fine bubbles have several unique properties including long lifetime in liquid owing to their negatively charged surface, and high gas solubility into the liquid owing to their high internal pressure. These special features of ultra-fine bubbles have attracted attention from many industries such as food, cosmetics, chemical, medical, semi-conductor, soil and water remediation, aquaculture and agriculture.

SUMMARY

A mixing apparatus for generating and mixing gas bubbles, including for example, ultra-fine bubbles, into an aqueous solution includes a structure defining an interior fluid-flow chamber that extends along a longitudinal axis between an input port at a liquid input end and an output port at a liquid output end. The structure is characterized by a gas injection portion located upstream from the liquid output end and a mixing vane portion extending in the downstream direction from the gas injection portion. The gas injection portion defines a gas injection lumen and a first region of the interior fluid-flow chamber, while the mixing vane portion defines a second region of the interior fluid-flow chamber. The first region of the interior fluid-flow chamber includes a plurality of side fluid-path lumens that extend in the downstream direction alongside a first part of the gas injection lumen. This first part of the gas injection lumen, together with the side fluid-path lumens, merges with a downstream fluid-path lumen of the first region. The various lumens are arranged such that the first part of the gas injection lumen is closer to the longitudinal axis than any of the plurality of side fluid-path lumens.

BRIEF DESCRIPTION OF THE DRAWINGS

FIG. 6 is a schematic plane representation of the interior fluid-flow chamber of the mixing apparatus of FIG. 1A taken along the x-z plane of FIG. 1A to show bifurcation of the interior fluid-flow chamber into multiple fluid-flow paths.

FIG. 7 is a schematic end-view representation of the interior fluid-flow chamber of the mixing apparatus of FIG. 1A from the perspective of the liquid input end and rotated 90 degrees clockwise.

FIG. 8 is a schematic cross-section representation of an alternate configuration of a helical mixing vane component having a series of individual helical vane sections.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Disclosed herein are different versions or embodiments of ultra-fine bubble generating liquid/gas mixing apparatuses. In one version, referred to as a "multi-component" mixing apparatus," components of the apparatus are separately manufactured and coupled together with attaching hardware to form a complete apparatus. This version may also include some internal, removable components such as an O-ring gasket and gas inlet structure, e.g., diffuser. The multi-component version of the mixing apparatus allows for subsequent disassembly of the apparatus without destroying or damaging the structural integrity of the components. In another version, referred to as a "unitary, single-piece mixing apparatus," the apparatus is a single unitary structure, where "single unitary" means that the mixing apparatus does not have any separate components parts that require assembly, and that the mixing apparatus cannot be taken apart or disassembled without damaging or destroying either of the structural integrity or functional integrity of the mixing apparatus. In other words, the mixing apparatus is a single piece structure with no separately attached external or internal components.

Multi-Component Mixing Apparatus

Figure 1A:
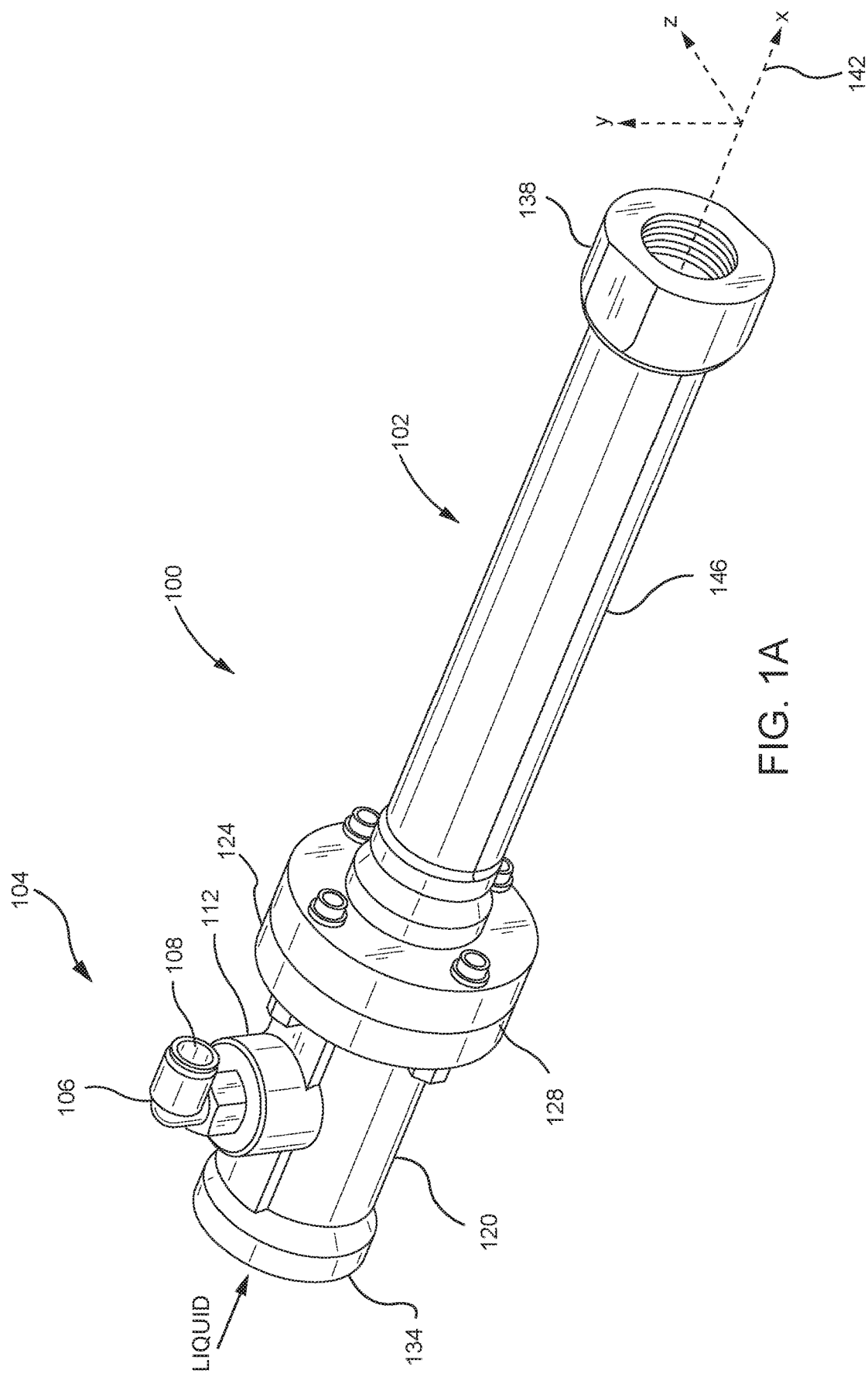
FIG. 1A is perspective illustration of a fully assembled, multi-component ultra-fine bubble generating liquid/gas mixing apparatus having a gas injection component and a helical mixing vane component forming a structure defining an interior fluid-flow chamber extending along a longitudinal axis between a liquid input end and a liquid output end.
Figure 1B:
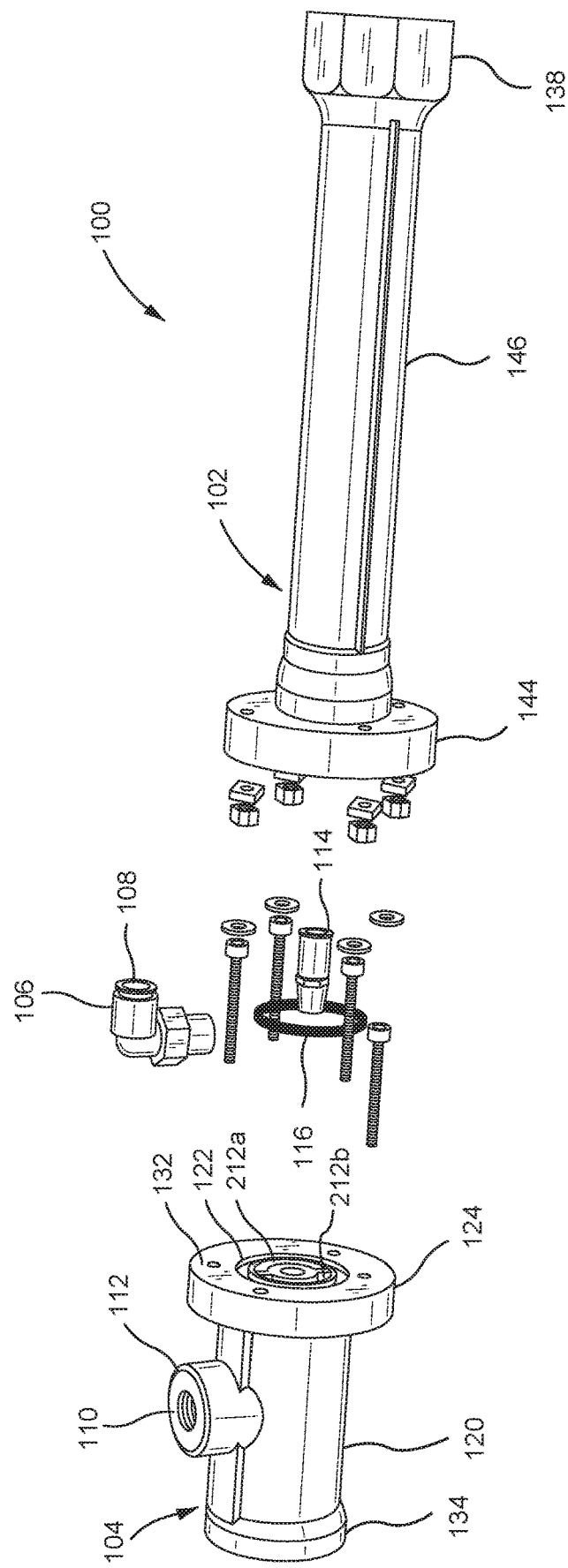
FIGS. 1B and 1C are different perspective illustrations of the mixing apparatus of FIG. 1A disassembled and exploded to show the gas injection component and the helical mixing vane component.
Figure 1C:
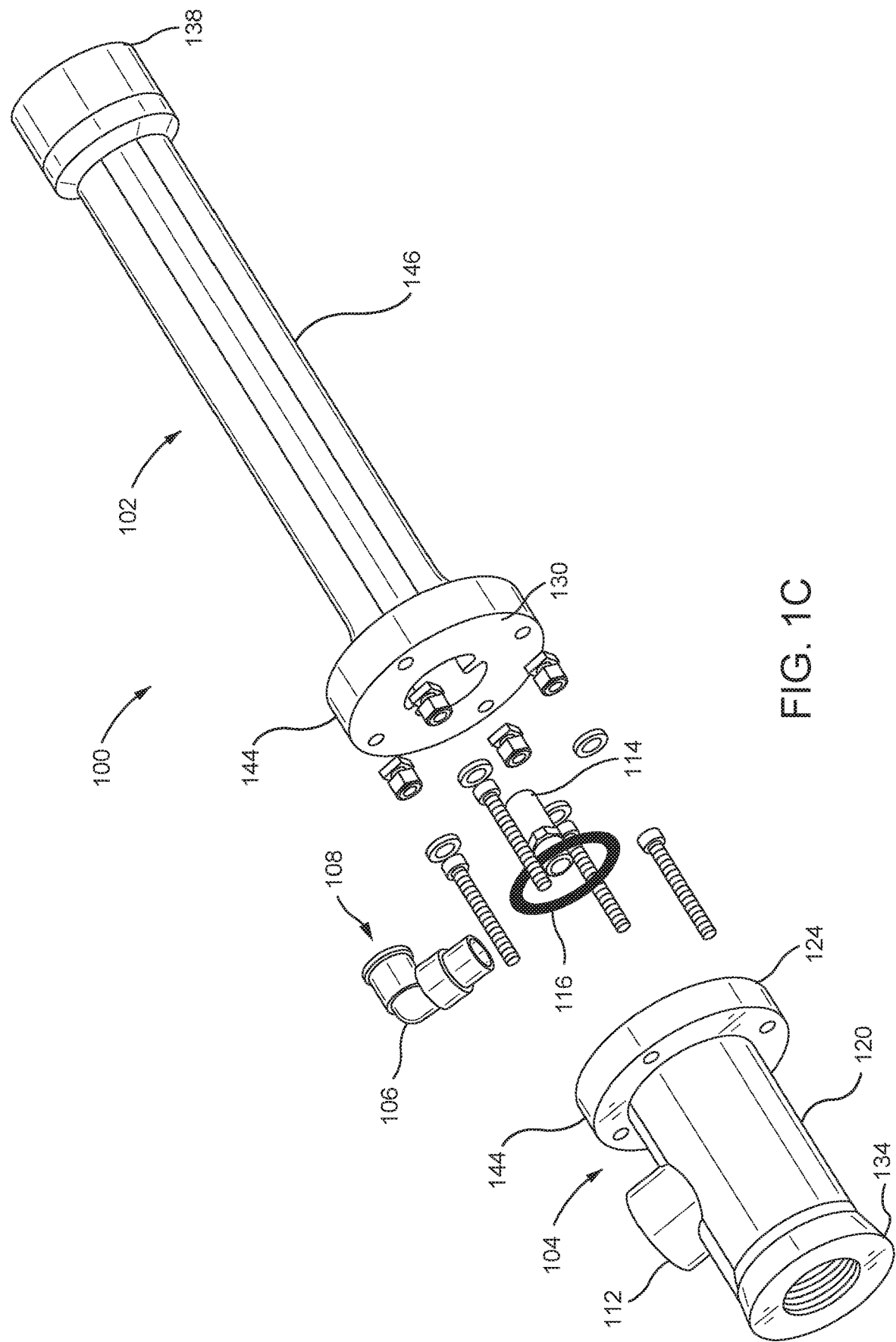
Figure 2:
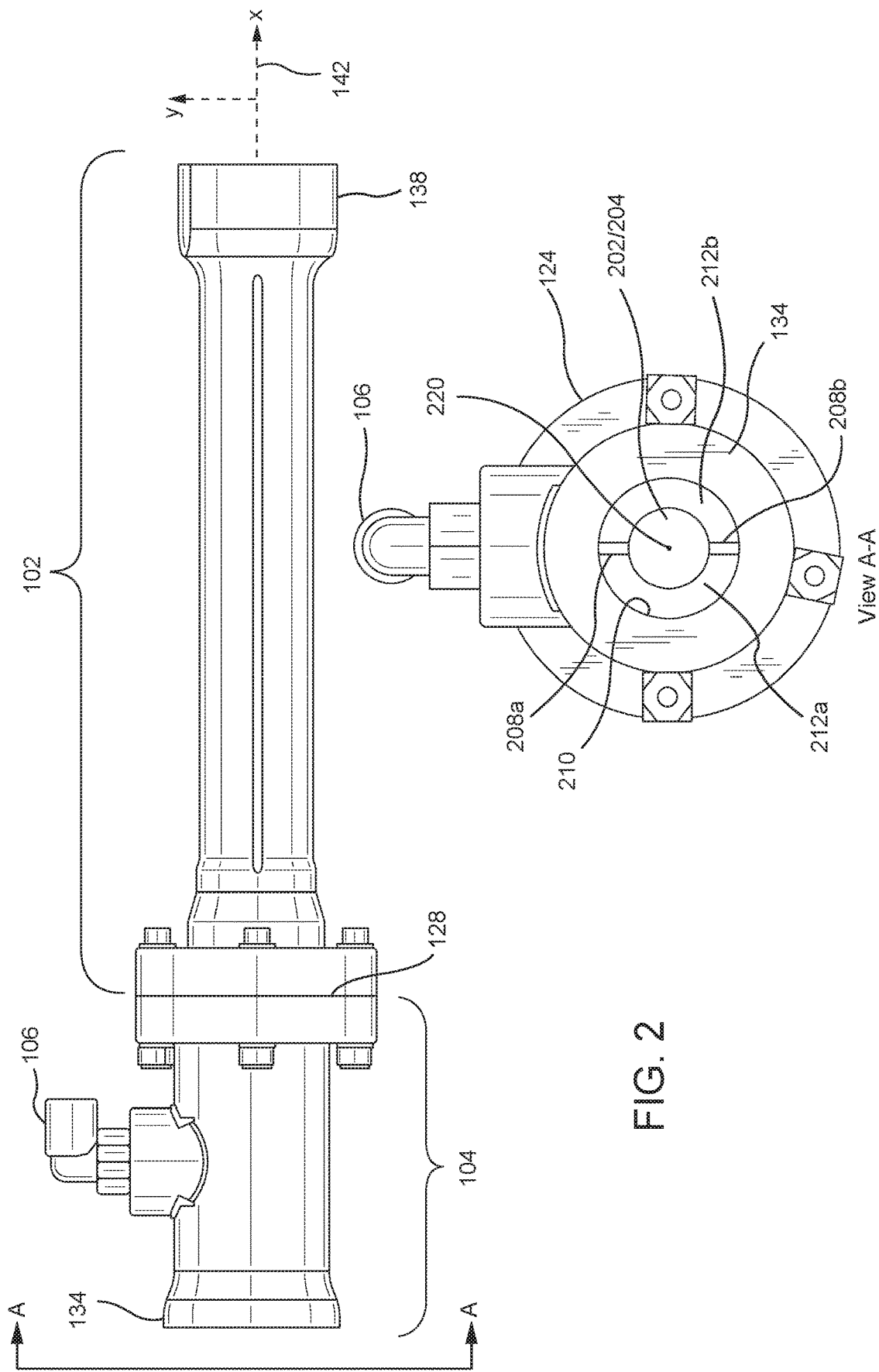
FIG. 2 includes a side view illustration of the mixing apparatus of FIG. 1A, and a scaled-up end-view illustration of the mixing apparatus, where the end view is from the perspective of the liquid input end.

With reference to FIGS. 1A-2, a multi-component ultra-fine bubble generating liquid/gas mixing apparatus 100 (herein after referred to as a "mixing apparatus") includes a gas injection component 104 and a mixing vane component 102. In one configuration, the mixing vane component 102 is a variable-pitch helical mixing vane. Each of the gas injection component 104 and the mixing vane component 102 defines a respective region of an interior fluid-flow chamber that extends along a longitudinal axis 142 (also referred to herein as the "x axis") between a liquid input end 134 and a liquid output end 138 of the mixing apparatus 100. The interior fluid-flow chamber defines multiple fluid-path lumens that guide fluid through the mixing apparatus. Regarding the longitudinal axis 142, while the example mixing apparatus 100 of FIGS. 1A-2 has a linear longitudinal axis, other embodiments of the mixing apparatus may have non-linear longitudinal axes that curve.

Moving from left to right in FIGS. 1A-2, or in the downstream direction from the liquid input end 134 of the mixing apparatus 100 to the liquid output end 138, the gas injection component 104 includes: a) the liquid input end through which liquid is input to the mixing apparatus, b) a gas input region 120 through which gas is injected into the mixing apparatus, and c) a downstream end 124 where the gas injection component couples to the mixing vane component 102.

The gas input region 120 of the gas injection component 104 includes an inlet portion 112 having an opening 110 that is configured to be coupled with a tubular elbow fitting 106. The tubular elbow fitting 106 defines a gas injection port 108 through which gas is injected into a gas injection lumen within the gas injection component 104. The gas input region 120 also defines multiple fluid-path lumens 212a, 212b that form a first region of the interior fluid-flow chamber of the mixing apparatus 100. As shown in FIG. 2, the fluid-path lumens 212a, 212b of the first region of the interior fluid-flow chamber are characterized by a C-shaped cross-section and accordingly are at times referred to herein as C-shaped lumens.

Continuing in the downstream direction, the mixing vane component 102 includes: a) an upstream end 144 where the mixing vane component couples with the gas injection component 104, b) a helical region 146, and c) the liquid output end 138 through which liquid/gas mixture exist the mixing apparatus 100. The helical region 146 defines multiple fluid-path lumens, each lumen twisting around the longitudinal axis 142 to form a helical fluid-path lumen that guides fluid in the downstream direction toward the liquid output end 138 of the mixing apparatus 100. The helical fluid-path lumens form a second region of the interior fluid-flow chamber of the mixing apparatus 100. The helical fluid-path lumens of the second region of the fluid-flow chamber are equal in number with the C-shaped fluid path lumens of the first region of the fluid-flow chamber. For example, the mixing apparatus 100 of FIGS. 1A-2 has two C-shaped fluid path lumens, each of which transitions to a corresponding helical fluid-path lumen.

In one configuration, each of the mixing vane component 102 and a gas injection component 104 may be separately manufactured as a single-piece, unitary component using 3D printing. In another configuration, each of the mixing vane component 102 and the gas injection component 104 may be separately manufactured using injection molding techniques. For example, separate molds may be used to form different portions of the mixing vane component 102 and the gas injection component 104 relative to the longitudinal axis 142 of the apparatus. In one implementation, each molded portion may be one half of the mixing vane component 102 and one half of the gas injection component 104 along the longitudinal axis 942.

Once the mixing vane component 102 and a gas injection component 104 are manufactured, they are assembled with a gas inlet structure 114 and an O-ring 116 and secured together using various fastening components, e.g., nuts, bolts, washers, and a silicon sealant. The gas inlet structure 114 (also referred to herein as a muffler or a diffuser) provides a gas injection interface between gas received through the inlet portion 112 of the gas injection component 104 and the interior fluid-flow chamber of the mixing apparatus 100. The O-ring 116 fits within an annular groove 122 (visible in FIG. 1B) formed in the downstream end 124 of the gas injection component 104. The O-ring 116 provides a seal between liquid/gas mixture flowing through the interior fluid-flow chamber of the mixing apparatus 100 (which chamber passes through the inside of the O-ring) and any gap 128 that may exist between abutting surfaces 130, 132 of the mixing vane component 102 and the gas injection component 104 after assembly of the components.

After manufacture or manufacture and assembly, the mixing apparatus 100 may be encased in a sleeve. This may be accomplished by placing the mixing apparatus 100 in a heat-shrink tube; and then heating the tube to shrink into contact with the outer surface of the apparatus to thereby provide an impenetrable sleeve over the entire apparatus.

With reference to FIGS. 2-5, in one configuration the gas injection component 104 includes an outer wall 224 that surrounds a first geometric structure 202 and a second geometric structure 204 that is downstream from the first geometric structure. In one configuration the first geometric structure 202 is in the form of a solid cone and is thus referred to herein as "a conical structure," and the second geometric structure is in the form of a hollow cylinder and is thus referred to herein as "a hollow cylindrical structure." The conical structure 202 has a tip 220 that faces the liquid input end 134 of the mixing apparatus 100 and a base 222 opposite the tip. The conical structure 202 functions to constrict the flow of fluid into the gas injection component 104 just enough to maintain a constant back pressure. This reduces the voids in the water stream that may collect large gas bubbles.

The base 222 of the conical structure 202 transitions to the hollow cylindrical structure 204. The interior of the hollow cylindrical structure 204 defines a first portion 206 of the gas injection lumen that extends along the length of the cylinder. Extending from the outer surface of the hollow cylindrical structure 204 are two wing structures 208a, 208b positioned on opposite sides of the cylinder. The wing structures 208a, 208b extend to and merge with an interior surface 210 (visible in FIG. 2, view A-A) of the outer wall 224 of the gas injection component 104.

The space between the outer surfaces of the conical structure 202 and the hollow cylindrical structure 204 and the interior surface 210 of the outer wall 224 of the gas injection component 104 define the first region of the interior fluid-flow chamber. With reference to FIG. 2, view A-A, the wing structures 208a, 208b divide the space between the outer surface of the hollow cylindrical structure 204 and the interior surface 210 of the outer wall 224 to form a pair of separate fluid-path lumens 212a, 212b, which extend along opposite sides of the gas injection component 104. At this first region of the interior fluid-flow chamber, the fluid-path lumens 212a, 212b are generally C-shaped in cross section and extend from the base 222 of the conical structure 202 to the downstream end 124 of the gas injection component 104. In this configuration, the first region of the interior fluid-flow chamber defined by the gas injection component 104 may be characterized as a "bifurcated" first region of the interior fluid-flow chamber. The space between surfaces that define the first region of the interior fluid-flow chamber may also be referred to as a "void", where the void is defined by the absence of any solid material that forms the gas injection component 104.

With reference to FIGS. 6 and 7, a first section 602 of the first region of the interior fluid-flow chamber defined by the gas injection component 104 or a gas injection portion extends between point "a" and point "b,", and has a first interior radius at point "a" between the tip 220 of the conical structure 202 and the interior surface 210 of the gas injection component at point "a". At the base 222 of the conical structure 202 the interior chamber or void bifurcates into two C-shaped fluid-path lumens 212a, 212b. The width at the beginning of the C-shaped fluid-path lumens 212a, 212b is identified as point "b." This width may be referred to as the radii of the void at point "b," which corresponds to the interior radius of the gas injection component 104 from the center 608 of the gas injection component to the interior surface 210 of the gas injection component at point "b," minus the portion of that radius that is filled with solid material.

A second section 604 of the first region of the interior fluid-flow chamber extends between point "b" and point "c" as shown in FIG. 6. Along the length of the second section 604, the widths of the C-shaped fluid-path lumens 212a, 212b taper down in size relative to the width at point "b." The width at the end of the C-shaped fluid-path lumens 212a, 212b is identified as point "c." This width may be referred to as the radii of the void at point "c," which corresponds to the interior radius of the gas injection component from the center 612 of the component to the interior surface 210 of the gas injection component 104 at point "c," minus the portion of that radius that is filled with solid material. In one example configuration, the radii of the void at point "a" is approximately 0.91", the width (or radii of the void) at point "b" is approximately 0.88", and the width (or radii of the void) at point "c" is approximately 0.82".

Figure 3:
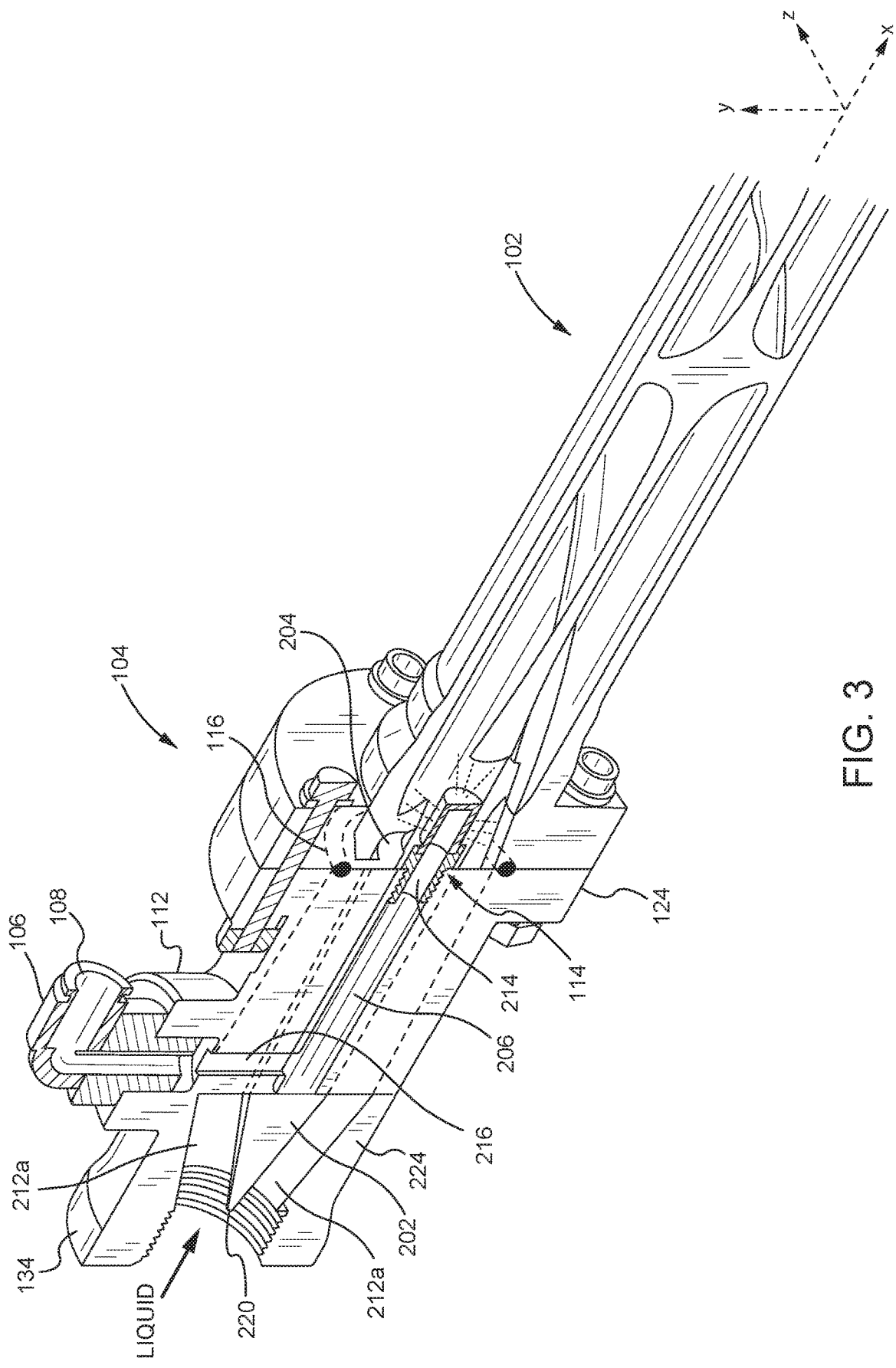
FIG. 3 is a perspective cross-section illustration of the mixing apparatus of FIG. 1A taken along the x-y plane of FIG. 1A, with portions of solid material absent to expose internal structures and components of the mixing apparatus.
Figure 4:
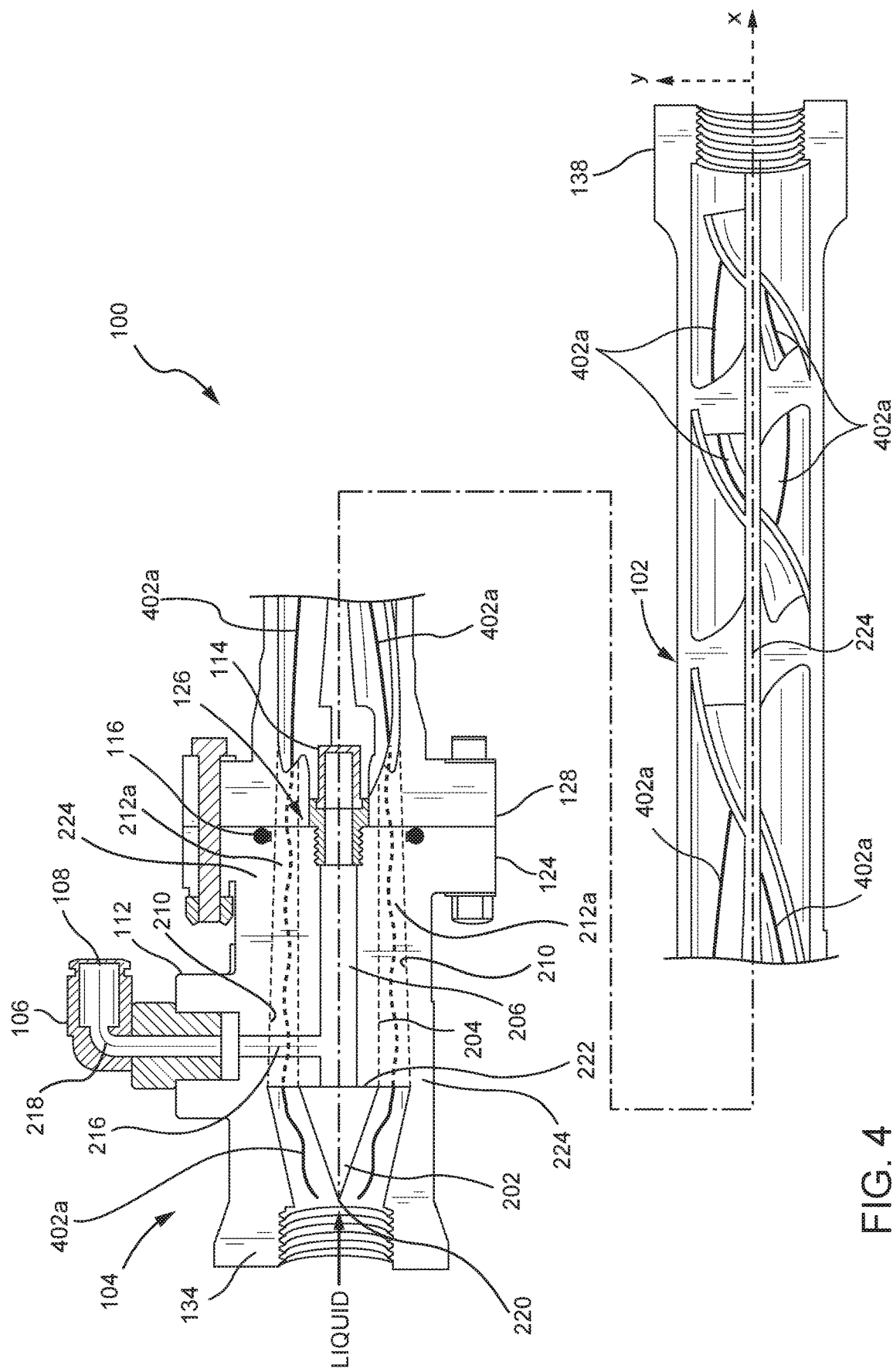
FIG. 4 is a planar cross-section illustration of the fully assembled mixing apparatus of FIG. 2 taken along the x-y plane of FIG. 2.
Figure 5:
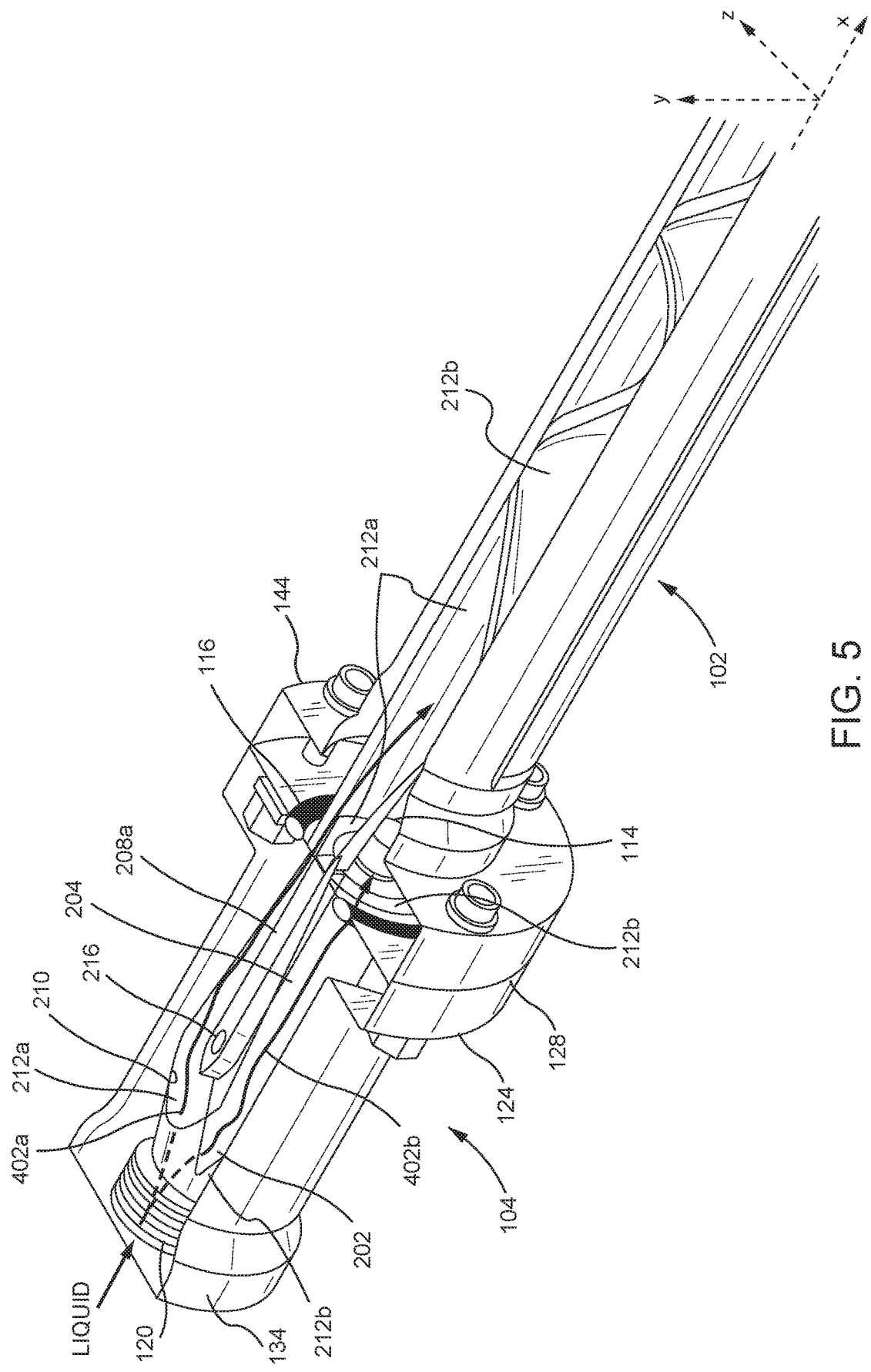
FIG. 5 is a perspective cross-section illustration of the fully assembled mixing apparatus of FIG. 1A taken along a x-z plane that is offset from the origin x-z plane, with portions of solid material absent to expose internal structures and components of the mixing apparatus.

With reference to FIGS. 3-5, as previously mentioned, the interior of the hollow cylindrical structure 204 defines a first portion 206 of a gas injection lumen of the gas injection component 104. This first portion 206 of the gas injection lumen extends along the longitudinal axis 142 of the mixing apparatus 100 from an upstream region of the hollow cylindrical structure 204 that is beneath the inlet portion 112 of the gas injection component 104 to a downstream region of the hollow cylindrical structure 204 at or near the downstream end 124 of the gas injection component. A gas inlet structure 114 extends from the downstream end of the hollow cylindrical structure.

In one configuration, the gas inlet structure 114 comprises a threaded base that screws into the first portion 206 of the gas injection lumen and a cap structure (also referred to as a muffler or a diffuser) that couples with the threaded base. The hollow interior 214 of the gas inlet structure 114 defines a second portion of the gas injection lumen. The cap structure includes a cylindrical sidewall and an end cap, each having a porous structure that permits injected gas to pass through. Alternatively, the gas inlet structure 114 may be configured as a simple Pitot type tube with holes passing through its sidewall and end cap. Configured as such the porous cap or Pitot tube allows for the injection of gas in multiple directions relative to the longitudinal axis 142 of the mixing apparatus 100. For example, with reference to FIG. 3, gas may be injected from the interior of the gas inlet structure 114 into the surrounding interior fluid-flow chamber in a direction radially outward relative to the longitudinal axis 142 and/or downstream, in the direction of the longitudinal axis.

In another configuration, where the mixing apparatus 100 is manufactured as a single unitary structure, a separate gas inlet structure 114 is not present. Instead, the gas inlet structure 114 is formed as part of the downstream region of the hollow cylindrical structure 204. For example, the downstream region of the hollow cylindrical structure 204 may comprise a reduced diameter portion that extends beyond the downstream end 124 of the gas injection component, which portion is formed to include a number of pores through which injected gas may pass in multiple directions relative to the longitudinal axis 142 of the mixing apparatus 100, as described above.

In yet another configuration, to allow for unimpeded injection of gas, a gas inlet structure 114 is not included and gas is injected through the downstream end of the hollow cylindrical structure in the direction of the longitudinal axis and into the surrounding interior fluid-flow chamber. This configuration, an example of which is described further below with reference to FIGS. 9-11, avoids detrimental issues, e.g., clogging and corroding, that may arise with the gas inlet structure Eliminating the gas inlet structure also allows for the mixing apparatus to be 3D printed in one piece, thereby substantially reducing manufacturing costs.

The gas injection lumen of the gas injection component 104 includes a third portion 216 that extends between the base of the inlet portion 112 to the first portion 206 of the gas injection lumen. Extending in this manner, the third portion 216 passes through the outer wall 224 of the gas injection component 104, through a wing structure 208a, and through the wall of the cylinder structure 204 before it merges with the first portion 206 of the gas injection lumen. The first, second and third portions 206, 214, 216 of the gas injection lumen may have any of a number of cross-section shapes. In one configuration, the first portion 206 and second portion 214 are cylindrical, while the third portion 216 is rectangular.

In operation, as shown in FIGS. 5 and 6, a liquid stream input through the liquid input end 134 of the gas injection component 104 is initially displaced and separated by the conical structure 202, with a first portion of the liquid being directed toward and into a first fluid-path lumen 212a to form a first liquid stream 402a, and a second portion of the liquid being directed toward and into a second fluid-path lumen 212b to form a second liquid stream 402b. The conical structure 202 and cylinder structure 204 thus function together to divide or expand a single stream of liquid into multiple liquid streams, e.g., two streams, as it passes through the gas injection component 104, and prior to the liquid reaching the mixing vane component 102. Because of this function, the gas injection component 104 may also be referred to as a "jet stream expander." Expansion of a single liquid stream into multiple liquid streams maximizes the amount of contact between injected gas and the liquid flowing through the gas injection component 104. Expansion into multiple liquid streams also allows the mixing vane component 102 to further compress and shear injected gas into ultra-fine bubbles of sub-micron size.

A method of mixing gas and liquid may include passing liquid through a venturi to create a low-pressure zone, thereby exposing a supply of gas to the low-pressure zone adjacent the venturi. This may allow low pressure suction to extract gas from the gas supply and expose the gas to more liquid before entering the mixing vane component 102. With reference to FIG. 6, the change in diameter and the widths of the C-shaped fluid-path lumens 212a, 212b of the interior fluid-flow chamber along the length of the second section 604 of the gas injection component 104 defines a funnel or venturi. The venturi formed by the interior fluid-flow chamber in the area of the C-shaped fluid-path lumens 212a, 212b provides a gradual reduction in the cross-section area of the fluid-path lumens along the length of the lumens and focuses each of the first liquid stream 402a and the second liquid stream 402b liquid stream along their respective fluid-path lumen 212a, 212b. The reduction in cross-section area of the C-shaped fluid-path lumens 212a, 212b increases the velocity of the liquid passing through the gas injection component 104 and creates a low pressure or suction area adjacent to the end of the C-shaped fluid-path lumens.

With reference to FIG. 5, as the first and second liquid streams 402a, 402b reach the end of their respective C-shaped fluid-path lumens 212a, 212b at the downstream end 124 of the gas injection component 104, each liquid stream transitions into a respective helical fluid-path lumen 212a, 212b in the mixing vane component 102. At this point, the liquid streams 402a, 402b surround the portion of the gas inlet structure 114 that extends into the mixing vane component 102. Gas being injected into the gas injection component 104 through the gas injection port 108 passes through the gas inlet structure 114 and mixes with the surrounding liquid streams 402a, 402b to form an ultra-fine bubble liquid/gas mixture. At this point the liquid streams 402a, 402b are now liquid/gas mixture streams.

As described above, the gas inlet structure 114 through which gas exits may be configured to allow for the injection of gas in multiple directions relative to the longitudinal axis 142 of the mixing apparatus 100, including radially outward relative to the longitudinal axis and downstream, in the direction of the longitudinal axis. Configured in this manner, the mixing apparatus 100 injects gas from a location close to the longitudinal axis 142, into fluid that surrounds the location, as the fluid flows past the location. In other words, the mixing apparatus is configured to inject gas into liquid from the inside out. This is distinct from other mixing apparatuses that are configured to inject gas into liquid from the outside in, for example, through an annular structure surrounding a fluid-flow path, such as disclosed in U.S. Pat. No. 5,935,490.

With reference to FIG. 6, the upstream end 144 of the mixing vane component 102 where each of the liquid streams 402a, 402b transitions from a C-shaped fluid-path lumen to a helical fluid-path lumen, begins as an almost straight blade 610 to reduce back pressure and prevent fluid flow loss. The pitch of the helical fluid-path lumens of the mixing vane component 102 may increase from almost straight to several revolutions per inch over the length of the mixing vane component. The helical fluid-path lumens of the mixing vane component 102 gradually constricts the flow of the liquid/gas mixture and shears and compresses the gas into the liquid. The increased rate of revolutions of the helical fluid-path lumens accelerates the flow of the liquid/gas mixture and further mixes the liquid and gas to create a solution with abundant ultra-fine bubbles.

As the compressed liquid/gas mixture exits through the liquid output end 138 of the mixing apparatus 100, the mixture is expanded slightly. This is done by attaching an exit tube (not shown) to the liquid output end 138. The exit tube may have an internal diameter that is slightly larger than the internal diameter at the liquid output end 138 of the mixing vane component 102. The enlarged internal diameter provided by the exit tube creates a vacuum effect that pulls the liquid/gas mixture forward through the liquid output end 138 and allows the spin of the liquid to stabilize before final discharge from the exit tube. This vacuum effect reduces back pressure on the liquid/gas mixture stream and flow loss associated with back pressure. As the compressed liquid/gas mixture passes through the liquid output end 138, the previously compressed gas bubbles in the liquid/gas mixture expand and explode creating even smaller bubbles of sub-micron size. In one configuration, an exit tube (not shown) is coupled to the mixing vane component 102 at the liquid output end 138. The exit tube is of a length sufficient to allow velocity and rotation of the liquid/gas mixture to slow to normal flow conditions before it discharges into a tank, reservoir or surface body of water. The normal flow condition prevents high speed collisions and forces that will dislodge the trapped ultra-fine gas bubbles.

In one configuration, the mixing vane component 102 may include a series of individual helical vane sections, of equal or different length, separated by a distance of "d" that is void of any helical structure. FIG. 8 is a schematic representation of a series of individual helical vane sections 802, 804, where a first helical vane section 802 has a length greater than a second helical vane 804. A series of helical vane sections may enable higher gas saturation with more gas injected in real time, while the increased pressure increases the gas transferred to the liquid. The separation distance "d" between adjacent helical vane sections 802, 804 that is void of any helical structure may be anywhere between a small fraction, e.g., one-sixteenth, of the inner diameter 808 of the adjacent mixing vane components 802, 804 to a multiple of the inner diameter. It has been found, however, that a separation distance 806 ranging from between one half of the inner diameter 808 to equal to the inner diameter is more effective in increasing the level of gas saturation.

With reference to FIGS. 1A-8, thus disclosed herein is a mixing apparatus 100 for generating and mixing gas bubbles into an aqueous solution. The mixing apparatus 100 includes a structure defining an interior fluid-flow chamber extending along a longitudinal axis 142 between a liquid input end 134 and a liquid output end 138. The structure is characterized by a gas injection portion and a mixing vane portion. The gas injection portion is located downstream from the liquid input end 134 and upstream from the liquid output end 138. The gas injection portion define a first region of the interior fluid-flow chamber and a gas injection lumen formed by first, second, and third portions 206, 214, 216. The gas injection lumen 206, 214, 216 is surrounded by the interior fluid-flow chamber and extends along a length of the gas injection portion. The gas injection lumen 206, 214, 216 is configured to inject gas from the interior of the gas injection lumen into the surrounding interior fluid-flow chamber. The mixing vane portion extends in the downstream direction from the gas injection portion and defines a second region of the interior fluid-flow chamber.

The structure may be formed of separately manufactured components that are assembled. For example, the gas injection portion may be in the form of a gas injection component 104 and the mixing vane portion may be in the form of a mixing vane component 102. Alternatively, the structure may be manufactured as a single component, portions of which respectively define a gas injection portion and a mixing vane portion.

The gas injection portion includes an outer wall 224 and a geometric structure 202, e.g., a cone, surrounded by the outer wall. The geometric structure has a tip 220 facing the liquid input end 134 and a base 222 facing the liquid output end 138. The gas injection portion also includes a hollow cylindrical structure 204, e.g., a cylinder, that is also surrounded by the outer wall 224. The hollow cylindrical structure 204 extends in the downstream direction from the base 222 of the geometric structure and has a hollow interior that defines a first portion 206 of the gas injection lumen. The outer wall 224 has an interior surface 210 and each of the geometric structure 202 and the hollow cylindrical structure 204 has an outer surface spaced apart from the interior surface 210. The space between the interior surface 210 and the outer surfaces of the geometric structure 202 and the hollow cylindrical structure 204 defines the first region of the interior fluid-flow chamber. The space between the interior surface and the outer surfaces changes in dimension along the length of the gas injection portion. The change in dimension creates a venturi that creates a low-pressure zone for liquid that may allow low pressure suction to extract gas from the gas injection lumen 206, 214, 216 and expose the gas to more liquid before entering the mixing vane component 102.

The hollow cylindrical structure 204 has a gas inlet structure 114 that extends from a downstream region of the hollow cylindrical structure. The gas inlet structure 114 has a hollow interior that defines a second portion 214 of the gas injection lumen. At least part of the second portion 214 of the gas injection lumen is configured to inject gas into the surrounding interior fluid-flow chamber in at least one of a plurality of directions relative to the longitudinal axis 142. For example, the gas inlet structure 114 may inject gas radially outward relative to the longitudinal axis 142 and/or downstream, in the direction of the longitudinal axis. In one configuration, the gas inlet structure 114 includes a hollow cap structure having at least one of a porous cylindrical sidewall and a porous end cap through which gas may injected into the surrounding interior fluid-flow chamber. In another configuration, the gas inlet structure is a reduced diameter portion of the downstream region of the hollow cylindrical structure 204 that is formed to include a number of pores through which gas may injected into the surrounding interior fluid-flow chamber.

The first region of the interior fluid-flow chamber defined by the gas injection portion may include a plurality of separate fluid-path lumens 212a, 212b. In one configuration, the plurality of separate fluid-path lumens 212a, 212b are partially defined by a pair of wing structures 208a, 208b that extend between the outer surface of the hollow cylindrical structure 204 and the interior surface 210 of the outer wall 224. One of the wing structures 208a, 208b may define a third portion 216 of the gas injection lumen. For example, the gas injection portion may include an inlet portion 112 having a base, and the third portion 216 of the gas injection lumen may extend from the base of the inlet portion 112 through one of the pair of wing structures 208a, 208b and into the first portion 206 of the gas injection lumen defined by the hollow cylindrical structure 204.

The plurality of separate fluid-path lumens 212a, 212b of the first region of the interior fluid-flow chamber are non-helical lumens. For example, the gas injection portion may define a pair of fluid-path lumens 212a, 212b having a C-shaped cross section that extend linearly along part of the gas injection portion. At the junction of the gas injection portion and the mixing vane portion, each of the separate non-helical fluid-path lumens 212a, 212b transition to a helical lumen of the second region of the interior fluid-flow chamber defined by the mixing vane portion. The mixing vane portion may include one helical vane region 802 or a plurality of helical vane regions 802, 804 arranged adjacently along the length of the mixing vane portion. In configurations having multiple helical vane regions, adjacent helical vane regions are separated by a separation distance 806 that defines an annular space between the adjacent helical vane regions.

Unitary, Single-Piece Configuration

With reference to FIGS. 9-12, a mixing apparatus 900 may be configured as a unitary, single-piece structure having no separate components parts, e.g., like the gas inlet structure, O-ring, nuts and bolts of the mixing apparatus configuration in FIG. 1A-1C. The unitary, single-piece mixing apparatus 900 includes a gas injection portion 904 and a mixing vane portion 902. In one configuration, the mixing vane portion 902 is a helical mixing vane. Each of the gas injection portion 904 and the mixing vane portion 902 defines a respective region of an interior fluid-flow chamber that extends along a longitudinal axis 942 (also referred to herein as the "x axis") between an input port 1052 at a liquid input end 934 of the mixing apparatus 900 and an output port 1054 at a liquid output end 938 of the mixing apparatus 900. The interior fluid-flow chamber defines multiple fluid-path lumens that guide fluid through the mixing apparatus. Regarding the longitudinal axis 942, while the example mixing apparatus 900 of FIGS. 9-12 has a linear longitudinal axis, other embodiments of the mixing apparatus may have non-linear longitudinal axes that curve.

Figure 9:
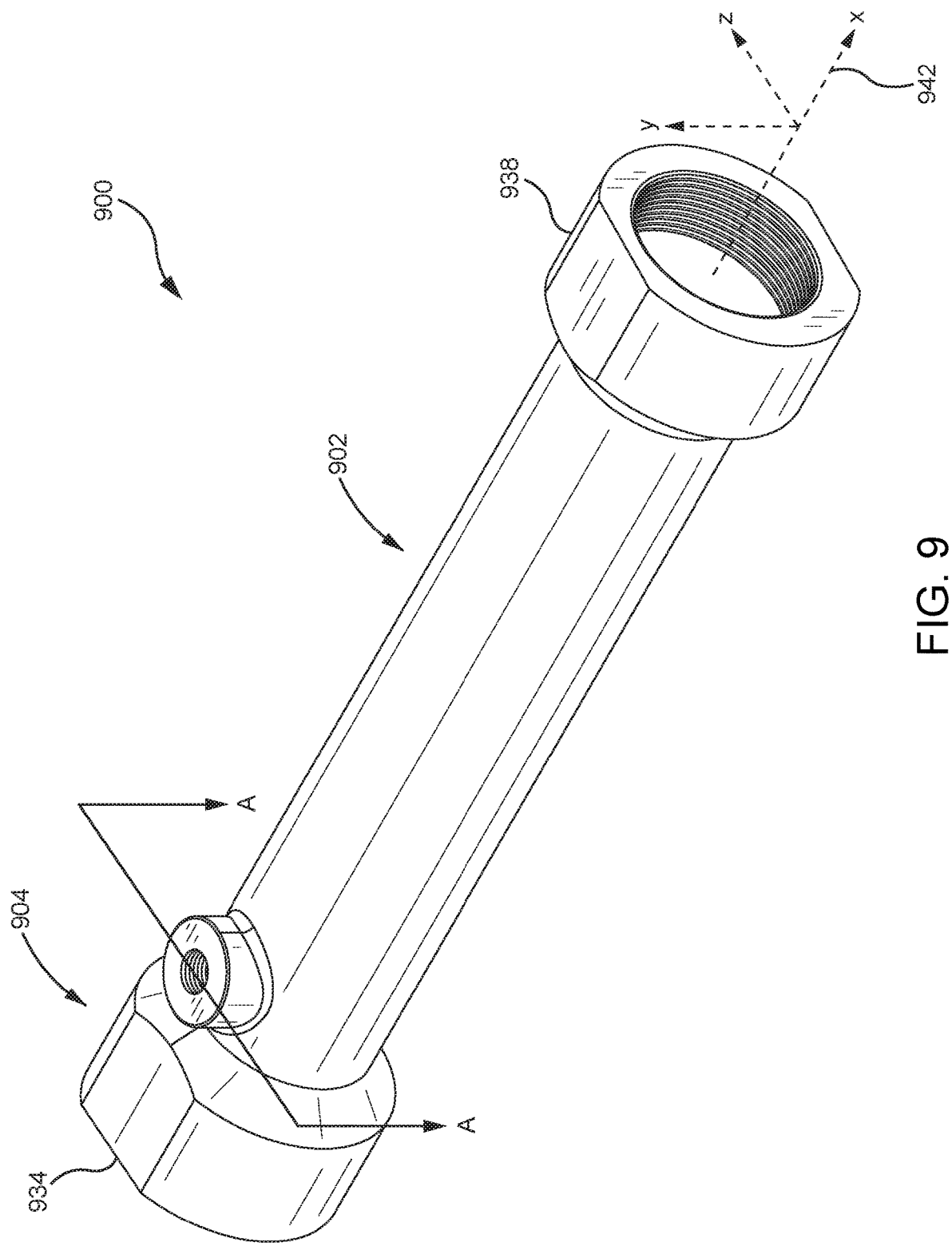
FIG. 9 is perspective illustration of a unitary, single-piece mixing apparatus having a gas injection portion and a helical mixing vane portion together defining an interior fluid-flow chamber extending along a longitudinal axis between a liquid input end and a liquid output end.
Figure 10:
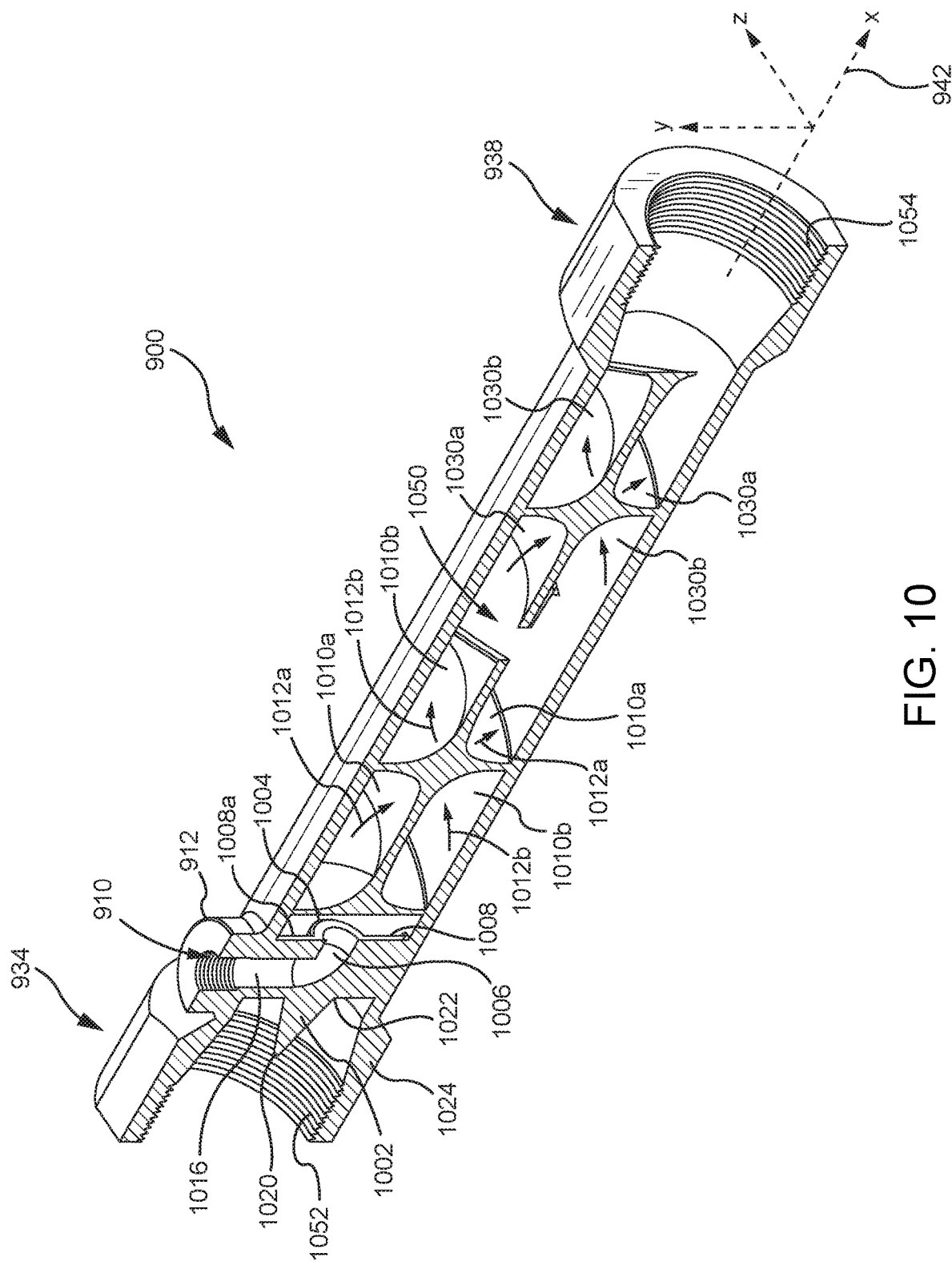
FIG. 10 is a perspective cross-section illustration of the mixing apparatus of FIG. 9 taken along the x-y plane and through the center of the mixing apparatus.
Figure 11:
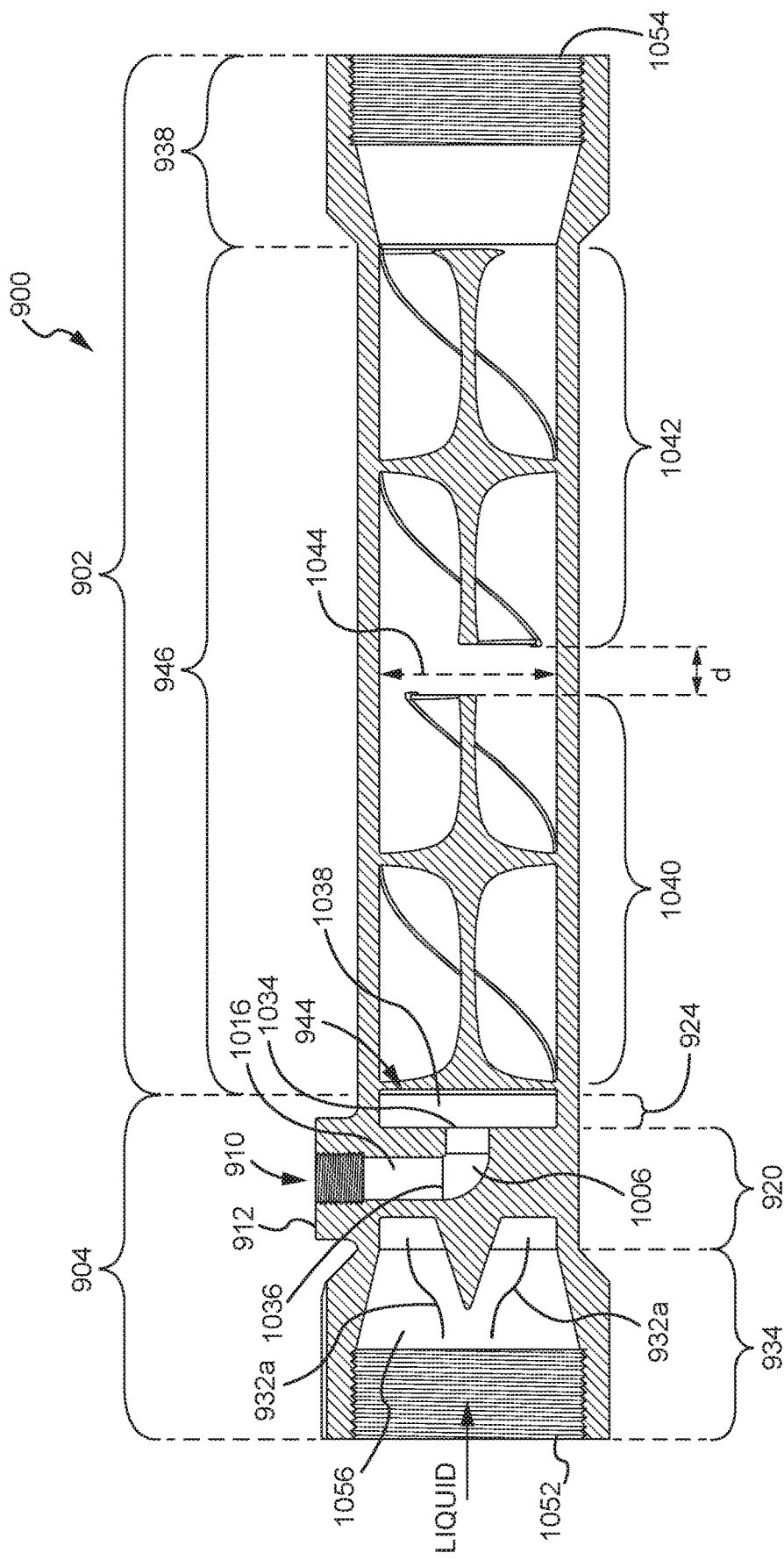
FIG. 11 is a planar cross-section illustration of the mixing apparatus of FIG. 9 taken along an x-y plane and through the center of the mixing apparatus.

Moving from left to right in FIGS. 9, 10 and 11, or in the downstream direction from the input port 1052 to the output port 1054, the gas injection portion 904 includes: a) a liquid input end 934 that includes the input port 1052 through which liquid is input to the mixing apparatus, b) a gas input portion 920 through which gas is injected into the mixing apparatus, and c) a downstream end 924 where the gas injection portion transitions to the mixing vane portion 902. The gas input portion 920 includes an inlet portion 912 having an opening 910 that is configured to be coupled with a tubular elbow fitting (not shown). The tubular elbow fitting defines a gas injection port through which gas is injected into a gas injection lumen within the gas injection portion 904.

Figure 12:
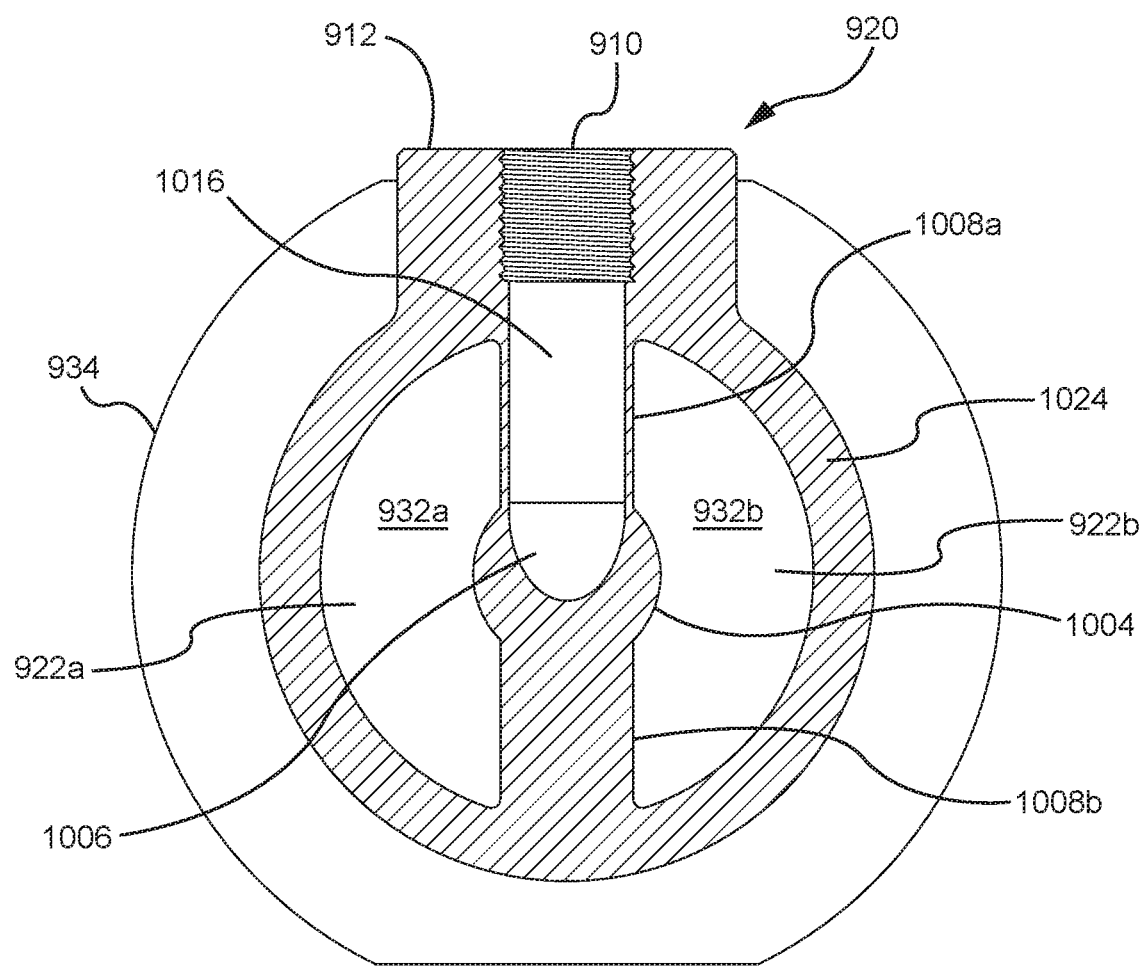
FIG. 12 is a planar cross-section illustration of the interior fluid-flow chamber of the mixing apparatus of FIG. 9 taken along an x-z plane and through the gas injection portion to show bifurcation of the interior fluid-flow chamber into multiple fluid-flow paths.

The gas injection portion 904 defines a first region of the interior fluid-flow chamber that includes multiple fluid-path lumens. With reference to FIG. 11, the interior of the liquid input end 934 defines an upstream tubular fluid-path lumen 1056 having a diameter that tapers down to the diameter of the gas input portion 920. The upstream tubular fluid-path lumen 1056 extends into the gas input portion 920 where it bifurcates into separate fluid-path lumens, referred to herein as side fluid-path lumens. With reference to FIG. 12, these side fluid-path lumens 922a, 922b are characterized by a C-shaped cross-section and accordingly are at times referred to herein as C-shaped lumens. The C-shaped lumens 922a, 922b merge into and are in fluid communication with a downstream tubular fluid-path lumen 1038 defined by the interior of the downstream end 924 of the gas injection portion 904.

Referring to FIGS. 9, 10 and 11 and continuing in the downstream direction, the mixing vane portion 902 includes: a) an upstream end 944 where the mixing vane portion merges with the gas injection portion 904, b) a helical region 946, and c) the liquid output end 938 that includes the output port 1054 through which liquid/gas mixture exits the mixing apparatus 900. As shown in FIG. 10, the helical region 946 defines multiple fluid-path lumens 1010a, 1010b, 1030a, 1030b, each lumen twisting around the longitudinal axis 942 to form a helical fluid-path lumen that guides fluid in the downstream direction toward the liquid output end 938 of the mixing apparatus 900. The helical fluid-path lumens 1010a, 1010b, 1030a, 1030b, form a second region of the interior fluid-flow chamber of the mixing apparatus 900. The helical fluid-path lumens 1010a, 1010b, 1030a, 1030b, of the second region of the fluid-flow chamber are equal in number with the C-shaped fluid-path lumens 922a, 922b of the first region of the fluid-flow chamber. For example, the mixing apparatus 900 of FIGS. 9-12 has two C-shaped side fluid-path lumens 922a, 922b, two corresponding first helical fluid-path lumens 1010a, 1010b, and two corresponding second helical fluid-path lumens 1030a, 1030b.

In one configuration, the unitary, single-piece mixing apparatus 900 of FIGS. 9-12 may be manufactured in its entirety as a single 3D printed object. In another configuration, different portions of the unitary, single-piece mixing apparatus 900 may be separately manufactured using injection molding techniques and then bonded together to form a unitary, single-piece mixing apparatus 900. For example, separate molds may be used to form different portions of the mixing apparatus 900 relative to the longitudinal axis 942 of the apparatus. In one implementation, each molded portion may be one half of the mixing apparatus 900 along the longitudinal axis 942. Regardless of how the unitary, single-piece mixing apparatus 900 is manufactured, the mixing apparatus is considered a single unitary structure, where "single unitary" means that the mixing apparatus does not have any separate components parts and that the mixing apparatus cannot be taken apart or disassembled without damaging or destroying either of the structural integrity or functional integrity of the mixing apparatus. In other words, the mixing apparatus 900 is a single piece of plastic with no separately attached external or internal components.

In any of the foregoing manufacturing configurations, after manufacture or manufacture and assembly, the mixing apparatus 900 may be encased in a sleeve. This may be accomplished by placing the mixing apparatus 900 in a heat-shrink tube; and then heating the tube to shrink into contact with the outer surface of the apparatus to thereby provide an impenetrable sleeve over the entire apparatus.

With continued reference to FIGS. 10 and 11, in one configuration the gas injection portion 904 includes an outer wall 1024 that surrounds a first geometric structure 1002 and a second geometric structure 1004 that extends in the downstream direction from the first geometric structure. The first geometric structure 1002 may be a solid cone having a solid surface that does not allow for the ingress of fluid. The second geometric structure 1004 may be a cylinder having a solid exterior surface that does not allow for the ingress of fluid. The second geometric structure 1004 is not entirely solid and includes a lumen that extends between an upstream end 1036 and a downstream opening 1034. The lumen at the interior of the second geometric structure 1004 defines a first part 1006 of the gas injection lumen.

The first geometric structure 1002, hereinafter referred to as the conical structure 1002, has a tip 1020 that faces the liquid input port 1052 of the mixing apparatus 900 and a base 1022 opposite the tip. The base 1022 of the conical structure 1002 transitions to the second geometric structure 1004, hereinafter referred to as the cylindrical structure 1004. The conical structure 1002 functions to constrict the flow of fluid into and through the gas injection portion 904 just enough to maintain a constant back pressure. This reduces the voids in the water stream that may collect large gas bubbles. The space between the outer surfaces of the conical structure 1002 and the interior surface of the outer wall 1024 of the gas injection portion 904 define an upstream tubular fluid-path lumen 1056 of the first region of the interior fluid-flow chamber.

With reference to FIGS. 10 and 12, integral with and extending from the outer surface of the cylindrical structure 1004 are first and second wing structures 1008a, 1008b positioned on opposite sides of the cylinder. The first and second wing structures 1008a, 1008b extend to and merge or integrate with an interior surface of the outer wall 1024 of the gas injection portion 904. "Integral" and "integrate with" in this context mean that the material forming the wing structures 1008a, 1008b is contiguous at one end with the material forming the cylindrical structure 1004, and at the opposite end with the material forming the outer wall 1024. In other words, the wing structures 1008a, 1008b are not separate parts that are adhered or bonded to the cylindrical structure 1004 and the outer wall 1024.

With reference to FIGS. 10, 11 and 12, the first and second wing structures 1008a, 1008b divide the space between the outer surface of the cylindrical structure 1004 and the interior surface of the outer wall 1024 to define a pair of side fluid-path lumens 922a, 922b of the first region of the first region of the interior fluid-flow chamber. These side fluid-path lumens 922a, 922b extend along opposite sides of the gas injection portion 904. In this area of the first region of the interior fluid-flow chamber, the fluid-path lumens 922a, 922b are generally C-shaped in cross section and extend from the base 1022 of the conical structure 1002 to the end of the cylindrical structure 1004. The area of the first region of the interior fluid-flow chamber defined by the gas injection portion 904 may be characterized as a "bifurcated" area of the interior fluid-flow chamber. The side fluid-path lumens 922a, 922b merge into and are in fluid communication with a downstream tubular fluid-path lumen 1038 that is defined by a space bounded by the interior surface of the outer wall 1024. The various spaces between surfaces that define the various areas of the first region of the interior fluid-flow chamber may also be referred to as "voids", where a void is defined by the absence of any solid material that forms the gas injection portion 904.

As previously mentioned, the interior of the cylindrical structure 1004 defines a first part 1006 of a gas injection lumen of the gas injection portion 904. This first part 1006 of the gas injection lumen is in the form of a 90-degree elbow having a downstream opening 1034 at the end of the cylindrical structure 1004 and an upstream end 1036 that is beneath the inlet portion 912 of the gas injection portion 904. The gas injection lumen merges into and is in fluid communication with the downstream tubular fluid-path lumen 1038 through the downstream opening 1034. The gas injection lumen does not include any structure that would impede the flow of gas into the downstream tubular fluid-path lumen 1038. For example, unlike the mixing apparatus of FIGS. 1A-1C, there is no gas diffuser at the downstream opening 1034.

The gas injection lumen of the gas injection portion 904 includes a second part 1016 that extends from the upstream end 1036 the first part 1006 through the inlet portion 912. The second part 1016 of the gas injection lumen is arranged transverse to the first part 1006 and in one configuration, has an axis that extends generally perpendicular to the longitudinal axis of the first part. Extending in this manner, the second part 1016 of the gas injection lumen passes through a thickness of the outer wall 1024 of the gas injection portion 904, through the first wing structure 1008a, and through the wall of the cylinder structure 1004 before it merges with and comes into fluid communication with the first part 1006 of the gas injection lumen. The first and second parts 1006, 1016 of the gas injection lumen may have any of a number of cross-section shapes. In one configuration, the cross-section shape of each of the first part 1006 and the second part 1016 is cylindrical.

In operation, a liquid stream input through the liquid input end 934 of the gas injection portion 904 is initially displaced and separated by the conical structure 1002, with a first portion of the liquid being directed toward and into a first fluid-path lumen 922a to form a first liquid stream 932a, and a second portion of the liquid being directed toward and into a second fluid-path lumen 922b to form a second liquid stream 932b. The conical structure 1002 and cylinder structure 1004 thus function together to divide or expand a single stream of liquid into multiple liquid streams, e.g., two streams, as it passes through the gas injection portion 904, and prior to the liquid reaching the mixing vane portion 902. Because of this function, the gas injection portion 904 may also be referred to as a "jet stream expander." Expansion of a single liquid stream into multiple liquid streams maximizes the amount of contact between injected gas and the liquid flowing through the gas injection portion 904. Expansion into multiple liquid streams also allows the mixing vane portion 902 to further compress and shear injected gas into ultra-fine bubbles of sub-micron size.

As the first and second liquid streams 932a, 932b reach the end of their respective C-shaped fluid-path lumens 922a, 922b, the liquid streams empty into the downstream tubular fluid-path lumen 1038 where they merge. The downstream tubular fluid-path lumen 1038 has a length along the longitudinal axis 942 that defines a distance between the end of the C-shaped side fluid-path lumens 922a, 922b and the beginning of the helical fluid-path lumens 1010a, 1010b. At this point, within the downstream tubular fluid-path lumen 1038, the liquid side fluid-path lumens 922a, 922b is located in front of, i.e., downstream from, the downstream opening 1034 of the gas injection lumen. Gas being injected into the gas injection portion 904 through the gas injection opening 910 passes through the downstream opening 1034 into the downstream tubular fluid-path lumen 1038 and mixes with the liquid present in the downstream tubular fluid-path lumen to form an ultra-fine bubble liquid/gas mixture. The upstream pressure within the mixing apparatus 900 causes the liquid/gas mixture to bifurcate into a pair of liquid/gas mixture streams 1012a, 1012b, each of which transitions into a respective helical fluid-path lumen 1010a, 1010b in the mixing vane portion 902.

The arrangement of the first part 1006 of the gas injection lumen relative to the C-shaped fluid-path lumens 922a, 922b and the downstream tubular fluid-path lumen 1038 enables the injection of gas through the downstream opening 1034 into the downstream tubular fluid-path lumen in a same direction, e.g., downstream and aligned with or parallel to the longitudinal axis 942, as the fluid flow through the C-shaped fluid-path lumens 922a, 922b into the downstream tubular fluid-path lumen 1038. Configured in this manner, the mixing apparatus 900 injects gas from a location close to the center, longitudinal axis 942 of the mixing apparatus and thus distant from the inner wall of the mixing apparatus. This is distinct from other mixing apparatuses that are configured to inject gas into liquid at a location at to the inner wall, for example, through an annular structure adjacent an inner wall and surrounding a fluid-flow path, such as disclosed in U.S. Pat. No. 5,935,490.

With reference to FIG. 11, the upstream end 944 of the mixing vane portion 902, where the liquid/gas fluid divides and enters the helical fluid-path lumens 1010a, 1010b, begins as an almost straight blade to reduce back pressure and prevent fluid flow loss. The pitch of the helical fluid-path lumens 1010a, 1010b of the mixing vane portion 902 may be consistent or uniform along the length of the mixing vane portion. Alternatively, the pitch of the helical fluid-path lumens 1010a, 1010b of the mixing vane portion 902 may increase from almost straight to several revolutions per inch over the length of the mixing vane portion. The helical fluid-path lumens 1010a, 1010b of the mixing vane portion 902 constricts the flow of the liquid/gas mixture and shears and compresses the gas into the liquid. In the case of a helical vane having an increasing pitch, the increased rate of revolutions of the helical fluid-path lumens accelerates the flow of the liquid/gas mixture and further mixes the liquid and gas to create a solution with abundant ultra-fine bubbles.

Continuing with FIG. 11, the mixing vane portion 902 includes a series of individual helical vane sections 1040, 1042 of equal or different length, separated by a distance of "d" that is void of any helical structure. AS shown in FIG. 10, each helical vane section 1040, 1042 defines a same number of helical fluid-path lumens 1010a, 101b, 1030a, 1030b. The distance "d" defines a gap in the mixing vane structure. A series of helical vane sections 1040, 1042 separated by a gap enables periodic merging and settling of liquid/gas mixture streams 1012a, 1012b and re-dividing thereof into separate liquid/gas steams. It has been found that the gap allows the spin of the liquid/gas mixture streams 1012a, 1012b resulting from a helical vane section 1040 to settle somewhat before the merged streams re-divide and accelerate into the next helical vane section 1042. This settling followed by acceleration increases shearing and the generation of more ultra-fine bubbles.

The separation distance "d" between adjacent helical vane sections 1040, 1042 that is void of any helical structure may be anywhere between a small fraction, e.g., one-sixteenth, of the inner diameter 1044 of the mixing vane portion 902 to a multiple of the inner diameter. It has been found, however, that a separation distance "d" ranging from between one half of the inner diameter 1044 to equal to the inner diameter is more effective in increasing the level of gas saturation. In the configuration shown in FIG. 10, a first helical vane section 1040 and a second helical vane 1042 are of equal length. In other configurations, the helical vane section may be of different length. In other configurations, more than two helical vane sections may be present.

The direction of the twisting of the lumens within the helical vane sections about and along the length of the longitudinal axis may be counterclockwise or clockwise depending on the geographical region in which the mixing apparatus 900 will be used. For example, versions of the mixing apparatus 900 to be used in the northern hemisphere will include helical vane sections that twist in the clockwise direction, while those to be used in the southern hemisphere will include helical vane sections that twist in the counterclockwise direction. This results in a higher concentration of ultra-fine bubbles because there is less turbulence when the water flows in its natural direction. When water flows counter to the earths rotational effects the water "rolls" over itself as it flows. This creates a lot of "collision" inside the mixing apparatus. This collision reduces flow, increases pressure, and causes the turbulence that releases $O_2$ molecules from the water. When water flows in its natural direction it avoids this collision, resulting in calmer water flow that increases velocity which increases the volume of the flow. This calm flow is actually higher than the standard flow tables you can get in a given pipe size. The higher flow velocity creates a slight vacuum at the injection point where the cross-sectional area is reduced just prior to the gas injection point. Also, a smaller pump using less energy can replace the larger pump needed to produce the same flow in a counter rotational example.

As the compressed liquid/gas mixture exits through the liquid output end 938 of the mixing apparatus 900, the mixture is expanded slightly. This is done by attaching an exit tube (not shown) to the liquid output end 938. The exit tube may have an internal diameter that is slightly larger than the internal diameter at the liquid output end 938 of the mixing vane portion 902. The enlarged internal diameter provided by the exit tube creates a vacuum effect that pulls the liquid/gas mixture forward through the liquid output end 938 and allows the spin of the liquid to stabilize before final discharge from the exit tube. This vacuum effect reduces back pressure on the liquid/gas mixture stream and flow loss associated with back pressure. As the compressed liquid/gas mixture passes through the liquid output end 938, the previously compressed gas bubbles in the liquid/gas mixture expand and explode creating even smaller bubbles of sub-micron size. In one configuration, an exit tube (not shown) is coupled to the mixing vane portion 902 at the liquid output end 938. The exit tube is of a length sufficient to allow velocity and rotation of the liquid/gas mixture to slow to normal flow conditions before it discharges into to a tank, reservoir or surface body of water. The normal flow condition prevents high speed collisions and forces that will dislodge the trapped ultra-fine gas bubbles.

Another embodiment of a unitary, single-piece mixing apparatus may be modeled after the multi-component mixing apparatus described above with reference to FIGS. 1A-8. To this end, the mixing apparatus 100 may be 3D printed in its entirety as a unitary, single-piece object by 3D printing, instead of separately 3D printing a mixing vane component 102 and a gas injection component 104 and assembling them. In this embodiment, there is no O-ring 116 and manufacture of the gas inlet structure 114 is integrated with the 3D printing process. For example, the gas inlet structure 114 may be formed as an internal structure of a gas injection portion of the mixing apparatus 100. Alternatively, the gas inlet structure 114 may not be included.

In other configuration, the mixing apparatus 100 may be manufactured using injection molding techniques. For example, separate molds may be used to form different portions of the mixing apparatus 100 relative to the longitudinal axis 142 of the apparatus. In one implementation, each molded portion corresponds one half of the mixing apparatus 100 along the longitudinal axis 142. Once molded, the two halves may be bonded together to form a single assembly of the mixing apparatus 100.

Thus, disclosed herein is a mixing apparatus 900 for generating and mixing gas bubbles, including for example, ultra-fine bubbles, into an aqueous solution. The mixing apparatus 900 includes a structure defining an interior fluid-flow chamber that extends along a longitudinal axis 942 between an input port 1052 at a liquid input end 934 and an output port 1054 at a liquid output end 938. The structure is characterized by a gas injection portion 904 located upstream from the liquid output end 938 and a mixing vane portion 902 extending in the downstream direction from the gas injection portion. The gas injection portion 904 defines a gas injection lumen having a first part 1006 and a second part 1016. The gas injection portion 904 also defined a first region of the interior fluid-flow chamber, while the mixing vane portion 902 defines a second region of the interior fluid-flow chamber. The first region of the interior fluid-flow chamber includes a plurality of side fluid-path lumens 922a, 922b that extend in the downstream direction alongside the first part 1006 of the gas injection lumen. This first part 1006 of the gas injection lumen, together with the side fluid-path lumens 922a, 922b, merges with a downstream fluid-path lumen 1038 of the first region. The various lumens 922a, 922b, 1006 are arranged such that the first part 1006 of the gas injection lumen is closer to the longitudinal axis 942 than any of the plurality of side fluid-path lumens 922a, 922b.

Manufacturing and Materials

The mixing apparatuses 100, 900 may be manufactured using 3D printing technology. For the multi-component version, each of the mixing vane component 102 and the gas injection component 104 may be separately manufactured as a unitary, single-piece object using 3D printing, and then assemble to form a mixing apparatus 100. For the unitary, single-piece versions, the entirety of the mixing apparatus 100, 900 may be manufactured as a single object.

In either version, the mixing apparatus 100, 900 may be 3D printed using a plastic or a metallic material. Regarding plastics, the components may be 3D printed, for example, in nylon or a polycarbonate material, e.g., PVC, and/or other compatible filament with high tensile strength to withstand the force of water flowing at high speeds. The selected 3D print material should also be compatible with the chosen gas to be injected. For example, polycarbonate is rated for ozone, while nylon is not. With respect to metallic materials, the components may be 3D printed, for example, in stainless steel.

The mixing apparatuses 100, 900 may be manufactured using techniques other than 3D printing. For example, the mixing apparatuses 100, 900 may be manufactured using a number of injection molds to form separate portions of the assembly, which portions are then joined together to form a mixing apparatus 100, 900. The portions may be formed of plastic and bonded together, or metal, e.g., coarse cast iron or aluminum, and welded together.

The mixing apparatuses 100, 900 may be manufactured in ½", ¾" and 1½" sizes for use in varying systems, where the size corresponds to the interior diameter of the apparatus at the liquid input end and the liquid output end. Larger liquid flows may be accommodated by an array of liquid/gas mixing apparatuses enclosed in a larger pipe. In this configuration, a portion of a large liquid flow is divided into separate portions, each of which passes through a liquid/gas mixing apparatus. Testing of a ½" size ultra-fine bubble generating liquid/gas mixing apparatus configured as disclosed herein, has generated ultra-fine bubbles having a size ~100 nanometers and concentration of 265,000,000 bubbles per ml, as measured using a NanoSight NS300 particle analyzer.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but instead are to be accorded the full scope consistent with the claim language. All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus for generating and mixing gas bubbles into an aqueous solution, the apparatus comprising:
    a structure defining an interior fluid-flow chamber extending along a longitudinal axis between an input port at a liquid input end and an output port at a liquid output end, wherein the structure is characterized by:
        a gas injection portion located upstream from the liquid output end, the gas injection portion defining a gas injection lumen and a first region of the interior fluid-flow chamber, the first region of the interior fluid-flow chamber comprising a plurality of side fluid-path lumens that extend in a downstream direction alongside a first part of the gas injection lumen, wherein the first part of the gas injection lumen and the plurality of side fluid-path lumens merge with a downstream fluid-path lumen of the first region, and the first part of the gas injection lumen is closer to the longitudinal axis than any of the plurality of side fluid-path lumens; and
        a mixing vane portion extending in the downstream direction from the gas injection portion and defining a second region of the interior fluid-flow chamber,
    wherein the first part of the gas injection lumen:
        extends to a downstream opening in fluid communication with the downstream fluid-path lumen, and
        is aligned to inject gas through the downstream opening and into the downstream fluid-path lumen in a direction downstream,
    wherein the downstream opening is void of any structure that would impede the flow of gas.

2. An apparatus for generating and mixing gas bubbles into an aqueous solution, the apparatus comprising:
    a structure defining an interior fluid-flow chamber extending along a longitudinal axis between an input port at a liquid input end and an output port at a liquid output end, wherein the structure is characterized by:
        a gas injection portion located upstream from the liquid output end, the gas injection portion defining a gas injection lumen and a first region of the interior fluid-flow chamber, the first region of the interior fluid-flow chamber comprising a plurality of side fluid-path lumens that extend in a downstream direction alongside a first part of the gas injection lumen, wherein the first part of the gas injection lumen and the plurality of side fluid-path lumens merge with a downstream fluid-path lumen of the first region, and the first part of the gas injection lumen is closer to the longitudinal axis than any of the plurality of side fluid-path lumens; and
        a mixing vane portion extending in the downstream direction from the gas injection portion and defining a second region of the interior fluid-flow chamber,
    wherein the gas injection portion comprises:
        an outer wall;
        a first geometric structure surrounded by the outer wall and having a tip facing the input port and a base facing the output port, wherein the first geometric structure is in a shape of a cone; and
        a second geometric structure surrounded by the outer wall and extending in the downstream direction from the base, wherein the second geometric structure comprises the first part of the gas injection lumen.

3. An apparatus for generating and mixing gas bubbles into an aqueous solution, the apparatus comprising:
    a structure defining an interior fluid-flow chamber extending along a longitudinal axis between an input port at a liquid input end and an output port at a liquid output end, wherein the structure is characterized by:
        a gas injection portion located upstream from the liquid output end, the gas injection portion defining a gas injection lumen and a first region of the interior fluid-flow chamber, the first region of the interior fluid-flow chamber comprising a plurality of side fluid-path lumens that extend in a downstream direction alongside a first part of the gas injection lumen, wherein the first part of the gas injection lumen and the plurality of side fluid-path lumens merge with a downstream fluid-path lumen of the first region, and the first part of the gas injection lumen is closer to the longitudinal axis than any of the plurality of side fluid-path lumens; and
        a mixing vane portion extending in the downstream direction from the gas injection portion and defining a second region of the interior fluid-flow chamber,
    wherein:
        the second region of the interior fluid-flow chamber comprises a plurality of first helical fluid-path lumens corresponding in number to the plurality of side fluid-path lumens, each first helical fluid-path lumen being in fluid communication with the first region of the interior fluid-flow chamber and extending along a length of the mixing vane portion.

4. The apparatus of claim 3, wherein the second region of the interior fluid-flow chamber comprises a plurality of second helical fluid-path lumens corresponding in number to the plurality of first helical fluid-path lumens and being downstream from the plurality of first helical fluid-path lumens, wherein the plurality of first helical fluid-path lumens and the plurality of second helical fluid-path lumens are separated by a space.

* * * * *